United States Patent
Osugi et al.

(10) Patent No.: US 9,231,652 B2
(45) Date of Patent: Jan. 5, 2016

(54) METHOD AND DEVICE FOR SEARCHING SIGNAL, GNSS SIGNAL RECEPTION APPARATUS AND INFORMATION EQUIPMENT TERMINAL

(71) Applicant: Furuno Electric Co., Ltd., Nishinomiya (JP)

(72) Inventors: Akihiro Osugi, Nishinomiya (JP); Kazuto Tada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/387,199

(22) PCT Filed: Feb. 18, 2013

(86) PCT No.: PCT/JP2013/053890
§ 371 (c)(1),
(2) Date: Sep. 22, 2014

(87) PCT Pub. No.: WO2013/140911
PCT Pub. Date: Sep. 26, 2013

(65) Prior Publication Data
US 2015/0049789 A1  Feb. 19, 2015

(30) Foreign Application Priority Data
Mar. 22, 2012  (JP) .................. 2012-064634

(51) Int. Cl.
*H04B 1/00*  (2006.01)
*H04B 1/715*  (2011.01)
*G01S 19/30*  (2010.01)
(Continued)

(52) U.S. Cl.
CPC ............... *H04B 1/715* (2013.01); *G01S 19/21* (2013.01); *G01S 19/30* (2013.01); *H04B 1/7136* (2013.01); *H04B 1/7143* (2013.01)

(58) Field of Classification Search
CPC ...................................................... H04B 1/715
USPC ............................................................ 375/137
See application file for complete search history.

(56) References Cited

U.S. PATENT DOCUMENTS 6,047,016 A * 4/2000 Ramberg et al. ............. 375/148
6,282,231 B1 * 8/2001 Norman et al. ............... 375/144
(Continued)

OTHER PUBLICATIONS

ISA Japanese Patent Office, International Search Report of PCT/JP2013/053890, Mar. 19, 2013, 2 pages.
(Continued)

*Primary Examiner* — Lihong Yu
(74) *Attorney, Agent, or Firm* — Alleman Hall McCoy Russell & Tuttle LLP

(57) ABSTRACT

A method for searching a signal to capture a target signal. Integrated correlation values are acquired with all code phases by setting a plurality of frequencies at intervals of 1,000 Hz into a single group. A peak correlation value that is a highest integrated correlation value with each frequency forming the group is acquired. The peak correlation values of the respective frequencies are compared to each other, a highest value thereof is set to be a highest peak value, and a second highest value thereof is set to be a highest noise value. If a ratio between the highest peak value and the highest noise value is lower than a threshold, it is determined that cross-correlation occurred, and if the ratio is higher than the threshold, the highest peak value is determined to be from the target signal, and the signal is captured.

12 Claims, 18 Drawing Sheets

(51) Int. Cl.
*G01S 19/21* (2010.01)
*H04B 1/7136* (2011.01)
*H04B 1/7143* (2011.01)

(56) References Cited

U.S. PATENT DOCUMENTS

| | | | |
|---|---|---|---|
| 6,810,072 B1 | 10/2004 | Akopian | |
| 7,110,435 B1 * | 9/2006 | Sorrells et al. | 375/147 |
| 7,161,977 B1 | 1/2007 | Jung | |
| 7,623,070 B2 | 11/2009 | Roh | |
| 2009/0207076 A1 * | 8/2009 | Schipper et al. | 342/357.15 |
| 2010/0117895 A1 * | 5/2010 | Mizuochi et al. | 342/357.02 |

OTHER PUBLICATIONS

European Patent Office, Extended European Search Report Issued in Application No. 13763854.0, Oct. 29, 2015, Germany, 7 pages.

\* cited by examiner

| FREQUENCY ZONE | ARc | ARn | ARf |
|---|---|---|---|
| NUMBER OF SUB SEARCH SIGNALS | 1 | 3 | 1 |
| INTEGRATING TIME PERIOD | Tc | Tn | Tf |

| SIGNAL INTENSITY ZONE | FREQUENCY ZONE | | |
| --- | --- | --- | --- |
| | ARc | ARn | ARf |
| ZONEs | 1 | 0 | 0 |
| ZONEn | 0 | 2 | 1 |
| ZONEw | 0 | 1 | 0 |

FIG. 16

METHOD AND DEVICE FOR SEARCHING SIGNAL, GNSS SIGNAL RECEPTION APPARATUS AND INFORMATION EQUIPMENT TERMINAL

TECHNICAL FIELD

This disclosure relates to a method of searching a desired signal among reception signals, and particularly relates to a method of searching a GPS signal in GNSS.

BACKGROUND ART

Currently, as one of GNSSs (Global Navigation Satellite Systems), there is GPS (Global Positioning System).

In GPS, positioning of a receiver is performed by receiving GPS signals transmitted from a plurality of GPS satellites, and using code phases and carrier phases of the received GPS signals. In GPS, a different diffusion code is set for every GPS satellite, and each GPS signal is code-modulated by the different diffusion code.

In such GPS, the GPS signal from a GPS satellite different from a target GPS satellite may be mistakenly captured as a target GPS signal and tracked. Such a phenomenon is called cross-correlation.

As a method of preventing cross-correlation, in Patent Document 1, in code phases with a single search frequency, by comparing integrated correlation values at respective code phase points, whether the acquired integrated correlation values are obtained from the target GPS signal or from cross-correlation is determined. FIG. 1 is a chart illustrating a concept of the signal searching method described in Patent Document 1.

With the method of Patent Document 1, an integrated correlation value is acquired at each code phase with a single search frequency, and these values are compared to each other. With the method of Patent Document 1, an integrated correlation value Vpk1 that is the highest value among the integrated correlation values at all the code phases is detected. Next, with the method of Patent Document 1, an integrated correlation value Vpk2 that is the second highest value among the integrated correlation values at all the code phases is detected. With the method of Patent Document 1, a ratio between the integrated correlation value Vpk1 which is the highest value and the integrated correlation value Vpk2 which is the second highest value is calculated. With the method of Patent Document 1, if the ratio is higher than a predetermined threshold, a code phase Cpk1 corresponding to the integrated correlation value Vpk1 which is the highest value is considered to be produced by the target signal, and the signal of the code phase Cpk1 is captured. On the other hand, if the ratio is lower than the threshold, the signal search continues.

Moreover, in Patent Document 2, the following method is used. First, a strong signal is detected based on a result of calculating an integrated correlation value in a fixed integrating period of time at a predetermined frequency interval. By utilizing that a difference between a frequency of the detected strong signal and a frequency of a capturing target has a predetermined connection with a signal level, a detection of cross-correlation is performed. Then, when the detected strong signal is determined to be cross-correlation, the signal search continues.

As described above, with the conventional signal searching methods, an integrating period of time for each code phase and frequency is fixed until the search can be carried out over a searching range, in other words, an entire code phase range and an entire frequency range in which the signal search is performed. Then, if the target signal is not successfully detected after such an entire search is completed at least once (a plurality of times depending on the case), the integrating time period is extended and the signal search is performed.

Moreover, in a case of detecting a weak signal, the integrating time period is set to be longer than the integrating time period for strong signal detection.

REFERENCE DOCUMENTS OF CONVENTIONAL ART

Patent Document(s)

Patent Document 1: U.S. Pat. No. 7,161,977B1
Patent Document 2: U.S. Pat. No. 7,623,070B2

DISCLOSURE OF THE INVENTION

Problems to be Solved by the Invention

However, with the method of Patent Document 1, after the highest integrated correlation value Vpk1 is detected, scanning needs to be performed again on the code phase axis to detect the integrated correlation value Vpk2 which is the second highest value. Therefore, compared to the case of simply detecting the code phase Cpk1 of the highest integrated correlation value Vpk1, twice the searching time length is required.

Moreover, with the method of Patent Document 1, the second highest integrated correlation value may become a code phase reaching toward the maximum point including the highest integrated correlation value Vpk1 (in the example of FIG. 1, the code phase Cpk2w). Therefore, the second highest integrated correlation value needs to be detected while excluding the predetermined code phase range including the code phase Cpk1 of the integrated correlation value Vpk1, and the processing becomes complicated.

Further, when the detection range of the second highest integrated correlation value on the code phase axis is not the entire code phase range and limited to a partial code phase range Coy as illustrated in FIG. 1, an integrated correlation value Vpk2' lower than the true second highest integrated correlation value Vpk2 may be detected. When this integrated correlation value Vpk2' is used, a ratio thereof to the integrated correlation value Vpk1 which is the highest value becomes larger than a true ratio. Therefore, in spite of being cross-correlation, a false determination in which the signal is determined as the target GPS signal easily occurs.

Moreover, with the signal searching method of Patent Document 2, since the integrated correlation values are calculated over the entire searching range with the same integrating time period as described above, a weak signal and the like cannot be detected even if the integrating time period is set to be short for example, the entire searching area needs to be searched repeatedly, and the integrating time period becomes long as a result. On the other hand, if the integrating time period is set to be long, the integrating time period at each integrated correlation value calculating point within a two-dimensional range of the code phase and the frequency becomes long, and the searching time length for the entire searching range becomes long.

Moreover, over the entire searching range, when the integrated correlation value is calculated with the same integrating time period, the influence of cross-correlation is easily received, and a possibility of causing the false determination described above cannot be reduced.

Thus, with the conventional methods of Patent Documents 1 and 2, the time length required for the determination of cross-correlation and the capturing of the true target signal becomes long and there is a possibility of the false determination of cross-correlation.

Therefore, the purpose of this disclosure is to provide a signal searching method, which can capture a target signal more accurately compared to the conventional methods, by simpler processing compared to the conventional methods.

SUMMARY OF THE INVENTION

A method of searching a signal to capture a target signal is provided, which includes acquiring a plurality of correlation values by correlating a reception signal with a plurality of replica signals of the target signal, the replica signals generated at a plurality of frequencies, respectively, that are set at frequency intervals as one group determined based on a cycle of a diffusion code used to modulate the target signal. The method also includes determining whether the target signal is successfully captured, based on the plurality of correlation values in the group.

With the method, whether the target signal is successfully captured is determined based on the following two frequency properties of the correlation values.

(i) If cross-correlation occurs, a peak of the correlation values appears at intervals according to the cycle of the diffusion code (frequency). Specifically, the peak correlation value is detected at specific frequency intervals.

(ii) For the true signal (target signal), it is utilized that only the peak correlation value at a single frequency is significantly high. Specifically, even with the plurality of frequencies set at the specific frequency intervals, only the correlation value at a specific frequency among the plurality of frequencies becomes drastically high compared to the correlation values at other frequencies.

When utilizing such frequency properties of the correlation values, by only comparing the peak correlation values comprised of maximum correlation values at the plurality of frequencies acquired simultaneously, respectively, the determination of whether the target signal is successfully captured can be performed. Thereby, the determination of whether the target signal is successfully captured can accurately be performed with comparatively simple processing.

Moreover, with the method of searching the signal of this disclosure, the target signal may be an L1 wave of a GPS signal, and Each frequency interval may be an interval of 1,000 Hz. This indicates a specific case where the L1 wave of the GPS signal is captured as the target signal. A C/A code which is the diffusion code used for modulating the L1 wave of the GPS signal is comprised of 1,023 chips, and a bit rate thereof is 1.023 Mbps and the code cycle is 1 msec. In the cross-correlation caused by the L1 wave using such a C/A code, the correlation value reaches a maximum value at about 1,000 Hz intervals. Therefore, if the correlation values are compared at the 1,000 Hz intervals, as described above, the difference between the correlation properties of the cross-correlation and the target signal is clarified.

Further, the method of searching the signal of this disclosure, the determining whether the target signal is successfully captured may include detecting a highest correlation value for every frequency in the group, setting the highest correlation values to be peak correlation values of the frequencies, respectively, and determining whether the target signal is successfully captured, based on a high/low relationship of the peak correlation values of the respective frequencies.

With the method, the specific example of determining whether the target signal is successfully captured is indicated. As described above, in the cross-correlation, the correlation values become substantially the same with each other at the frequency intervals determined based on the code cycle. The correlation value of the target signal becomes high only at the specific frequency. Therefore, by comparing the high/low relationship of the peak correlation values of the respective frequencies, whether the target signal is successfully captured can be determined accurately.

Further, with the method of searching the signal of this disclosure, the determining whether the target signal is successfully captured may include detecting a highest peak value that is a highest value among the peak correlation values of the respective frequencies, determining a highest noise value among the peak correlation values of the respective frequencies other than the highest peak value, and calculating a ratio between the highest peak value and the highest noise value. Whether the target signal is successfully captured may be determined based on the ratio obtained as above.

The method indicates a more specific determining method.

Further, with the method of searching the signal of this disclosure, when it is determined that the target signal is not successfully captured by the determining whether the target signal is successfully captured, the plurality of frequencies may be shifted by a fixed frequency width shorter than the frequency interval.

As described in the method, by repeating the determination of whether the target signal is successfully captured while each frequency is shifted by the fixed frequency, the determination of whether the target signal in the entire frequency band to be scanned for capturing is successfully captured can be performed. Thereby, the target signal can be captured accurately and surely.

Further, with the method of searching the signal of this disclosure, the acquiring, by setting the plurality of frequencies into one group, the plurality of correlation values may include setting a search reference frequency based on a frequency of a signal currently tracked and the frequency interval, setting, according to a difference between the search reference frequency and the search target frequency, an integrating period of time with the search target frequency, and calculating an integrated correlation value by integrating the correlation values for the set integrating time period.

The method utilizes that the signal currently tracked becomes the cause of the cross-correlation when capturing the target signal as a current search target. In view of this, the integrating time period with the current search target frequency can be determined according to a difference between the search reference frequency and the current search target frequency. The search reference frequency is obtained based on the frequency of the currently tracked signal and the frequency cycle set as described above, and the peak correlation value of cross-correlation is easily detected at the search reference frequency. That is, the integrating time period is changed according to the difference between the search reference frequency and the current search target frequency. Thereby, the influence of the cross-correlation by the currently tracked signal on capturing the target signal can be reduced. Further, by setting the integrating time period appropriately, compared to the case where the integrating time period is simply fixed, the total integrating time period over the entire frequency band can be shortened.

Further, with the method of searching the signal of this disclosure, the setting, according to the difference between the search reference frequency and the search target frequency, the integrating period of time may include determining a plurality of frequency zones that the search target frequency is able to selectively correspond to, according to the difference between the search reference frequency and the search target frequency. The setting may also include determining which one of the plurality of frequency zones the search target frequency belongs to, and setting the integrating time period for every frequency zone.

With the method, the search target frequencies are sorted into the plurality of frequency zones and the integrating time period is determined for every frequency zone. Thereby, compared to the case where the integrating time period is specifically determined for every individual search frequency, the determination of the integrating time period can be simplified and the required time length for the determination is shortened, without largely degrading the signal search performance.

Effect(s) of the Invention

According to this disclosure, the target signal can be captured with a simple method compared to the conventional method and more accurately than the conventional usage.

BRIEF DESCRIPTION OF DRAWINGS

FIG. 11 is a table illustrating one example of an integrating time period setting map.

FIG. 16 is a table illustrating one example of an integrating time period setting map including the signal intensity zones.

MODE(S) FOR CARRYING OUT THE INVENTION

A method of searching a signal according to one embodiment of this disclosure is described with reference to the drawings. Note that, in this embodiment, a searching method of an L1 wave of a GPS signal transmitted from a GPS satellite (hereinafter, simply referred to as the GPS signal) is described. However, without limiting to the L1 wave of the GPS signal, when capturing a signal that is code-modulated at a fixed code cycle, the following method can be applied.

Figure 1:
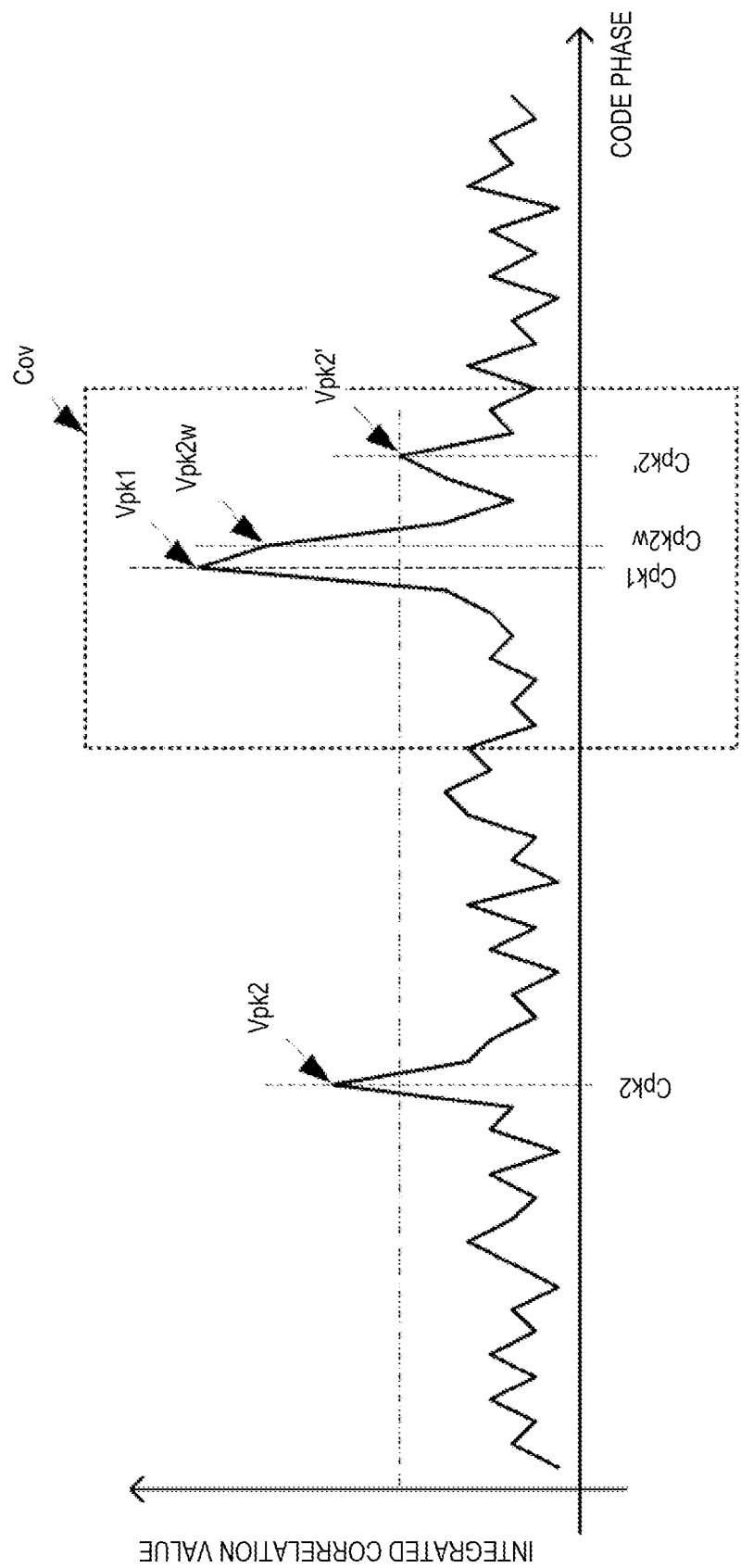
FIG. 1 is a chart illustrating a concept of a signal searching method described in Patent Document 1.
Figure 2:
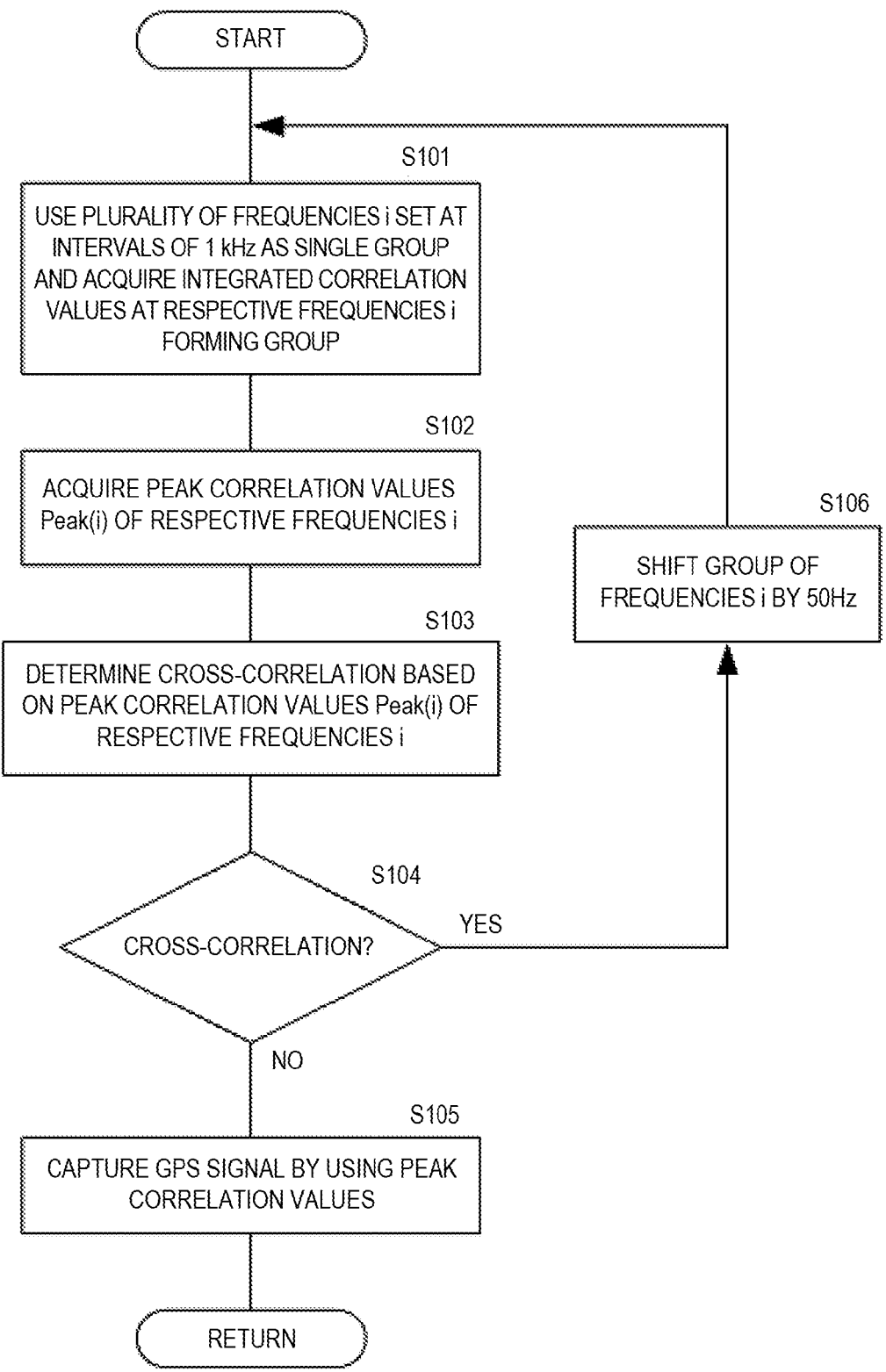
FIG. 2 is a flowchart of a signal searching method of one embodiment of this disclosure.
Figure 3:
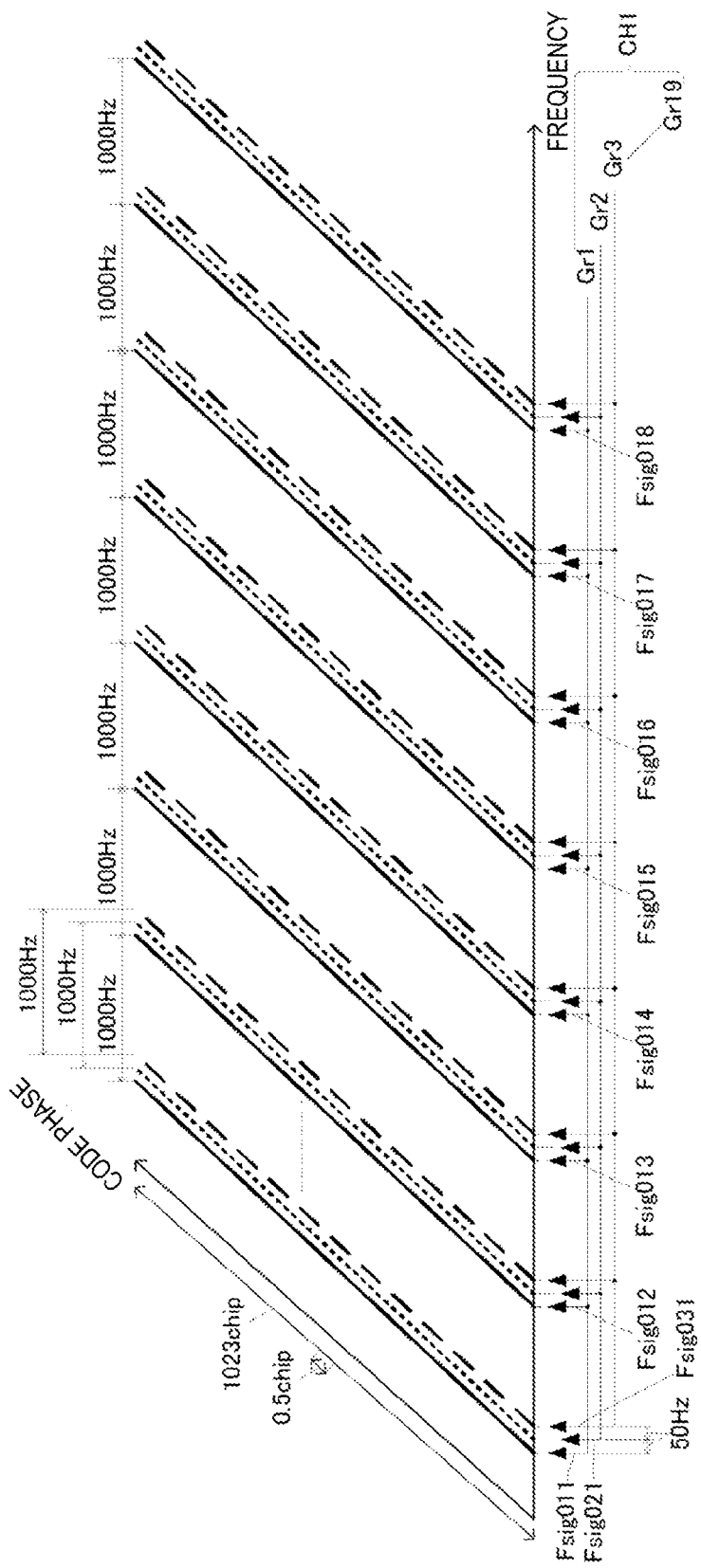
FIG. 3 is a view for describing a concept of setting a code phase and a frequency for calculating a correlation value.

FIG. 2 is a flowchart of the signal searching method of this embodiment. FIG. 3 is a view for describing a concept of setting a code phase and a frequency for calculating a correlation value.

As illustrated in FIG. 2, with the signal searching method of this embodiment, first, in a frequency zone of 8 kHz having a frequency of 1575.42 MHz of the GPS signal as a substantial central frequency of a scanning band, a reception signal is correlated with replica signals. Each replica signal is a signal produced by duplicating a C/A code used in the GPS signal. Further, with the signal searching method of this embodiment, correlation values are integrated over a predetermined time length for every combination of each code phase with each frequency to calculate an integrated correlation value.

Further, with the signal searching method of this embodiment, as illustrated in FIG. 3, in a code phase axial direction, within code phases of 1,023 chips with a single frequency, the correlation is performed for all the code phase points simultaneously with a resolution of 0.5 chip so as to calculate an integrated correlation value for every code phase point. The integrated correlation value group which can be obtained at a single frequency as above is referred to as integrated correlation values regarding frequency.

Moreover, with the signal searching method of this embodiment, in the frequency axial direction, by using eight frequencies set at intervals of 1,000 Hz as a single group, the correlation is performed in parallel with each other simultaneously to calculate the integrated correlation values. As a specific example, as illustrated in FIG. 3, in a group Gr1 including frequencies $F_{sig}011$, $F_{sig}012$, $F_{sig}013$, $F_{sig}014$, $F_{sig}015$, $F_{sig}016$, $F_{sig}017$ and $F_{sig}018$ at the intervals of 1,000 Hz, integrated correlation values are simultaneously calculated (S101).

Next, in a group Gr2 sectioned by shifting the frequency from the group Gr1 by 50 Hz (the group including a frequency $F_{sig}021$), correlation is performed for the eight frequencies simultaneously.

Next, in a group Gr3 sectioned by shifting the frequency from the group Gr2 by 50 Hz (the group including a frequency $F_{sig}031$), correlation is performed for the eight frequencies simultaneously.

Such correlation is performed sequentially from the group Gr1 to a group Gr19 to obtain integrated correlation values for a single channel that covers the entire scanning band (8 kHz). Then, when the correlation for the single channel is completed, the correlation starting from the group Gr1 is performed again sequentially. Note that, although shifting between the groups Gr may be performed simultaneously in parallel to a determination of cross-correlation described later, hereinafter, processing of shifting to the next group Gr when cross-correlation is determined in the group Gr where the determination of cross-correlation is performed, in other words, the target signal cannot be captured, is described.

Next, for every frequency i (i=1 to 8) configuring a single group Gr, all the integrated correlation values existing on the frequency i are compared to each other. Then, the integrated correlation value that is the highest value is acquired as a peak correlation value Peak(i) of the frequency i (S102).

Figure 4:
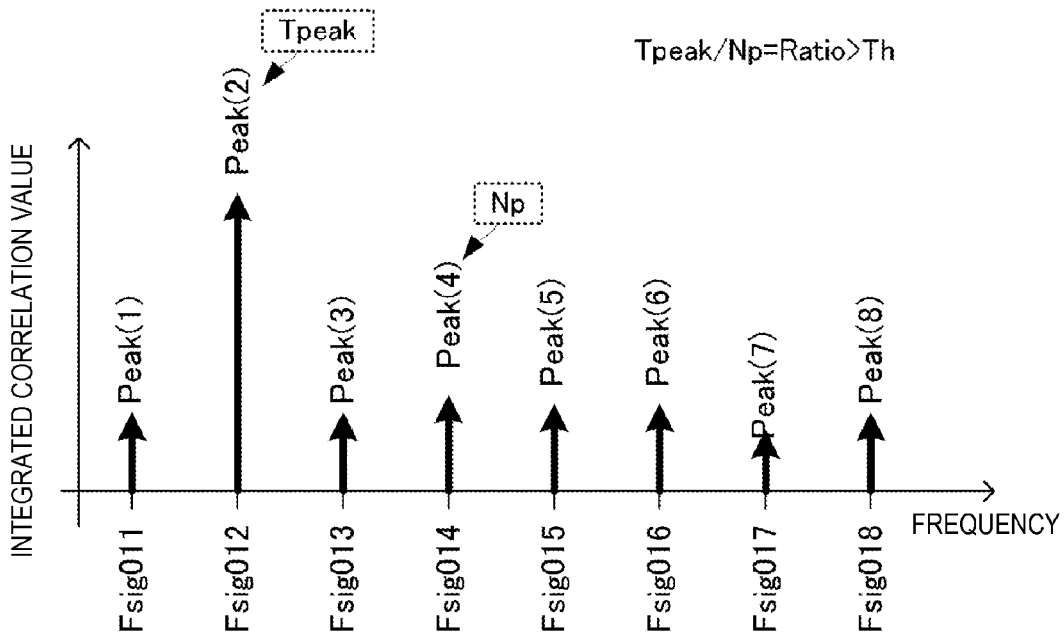
FIGS. 4(A) and 4(B) show a frequency property of a peak correlation value Peak(i) when a target GPS signal is captured, and a frequency property of a peak correlation value Peak(i) when cross-correlation occurs.
Figure 4:
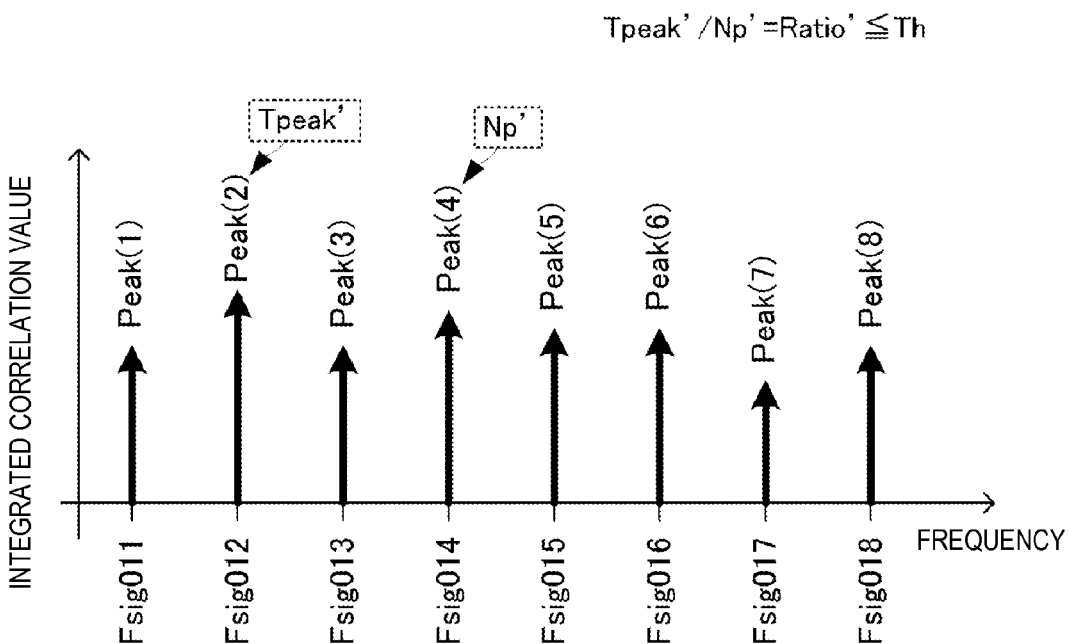

The peak correlation value Peak(i) of every frequency i acquired as above has properties as illustrated in FIGS. 4(A) and 4(B). FIG. 4(A) illustrates a frequency property of the peak correlation value Peak(i) when the target GPS signal is captured, and FIG. 4(B) illustrates a frequency property of the peak correlation value Peak(i) when cross-correlation occurs.

When the target GPS signal is captured, the peak correlation value of a specific frequency becomes significantly higher than the peak correlation value of other frequencies. Specifically, in the example of FIG. 4(A), a peak correlation value Peak(2) of the frequency i=2 which is the frequency $F_{sig}012$ becomes significantly higher than peak correlation values Peak(1), Peak(3) to Peak(8) of the frequency i=1, 3 to 8 which are the other frequencies $F_{sig}011$, $F_{sig}013$ to $F_{sig}018$ in the group Gr1.

When cross-correlation occurs, the acquired peak correlation values Peak(1) to Peak(8) of all the frequencies i=1 to 8 become substantially the same.

Figure 5:
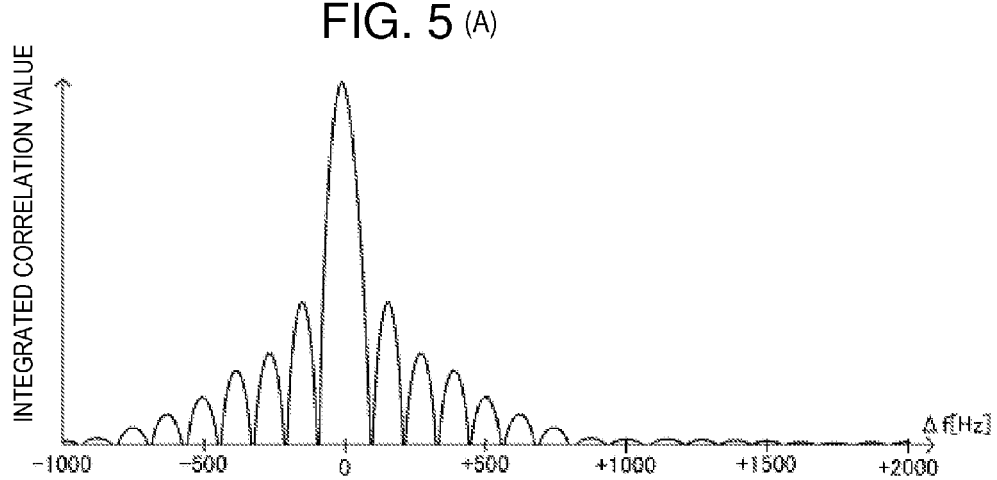
FIGS. 5(A) and 5(B) show charts illustrating a correlation property of the target GPS signal and a correlation property of the cross-correlation.
Figure 5:
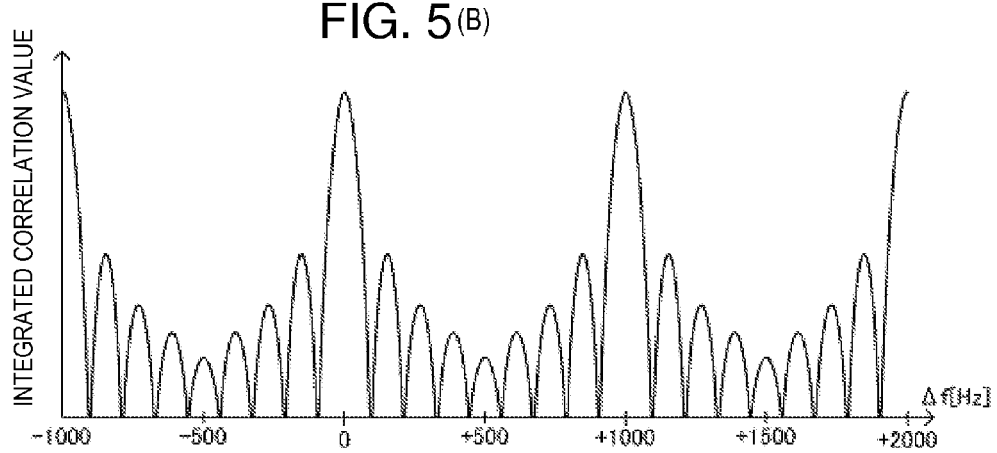

This is because a correlation property of the target GPS signal and a correlation property of cross-correlation have frequency properties as illustrated in FIGS. 5(A) and 5(B). FIG. 5(A) is a chart illustrating the correlation property of the target GPS signal and FIG. 5(B) is a chart illustrating the correlation property of cross-correlation.

As illustrated in FIG. 5(A), when the reception signal is the target GPS signal, the integrated correlation value becomes extremely high only at the frequency when the target GPS signal is received. On the other hand, the integrated correlation value becomes significantly low at other frequencies.

As illustrated in FIG. 5(B), when cross-correlation occurs, the integrated correlation value reaches a maximum value at 1,000 Hz intervals, and they become substantially the same integrated correlation value. This is because the C/A code is comprised of 1,023 chips and a bit rate is 1.023 Mbps. In other words, it is because the code cycle of the C/A code is 1 msec (millisecond), and the code cycle is 1,000 Hz.

By utilizing such correlation properties, with the signal searching method of this embodiment, subsequently, the capturing of the target GPS signal and the determination of cross-correlation are performed in the flow described as follows.

Figure 6:
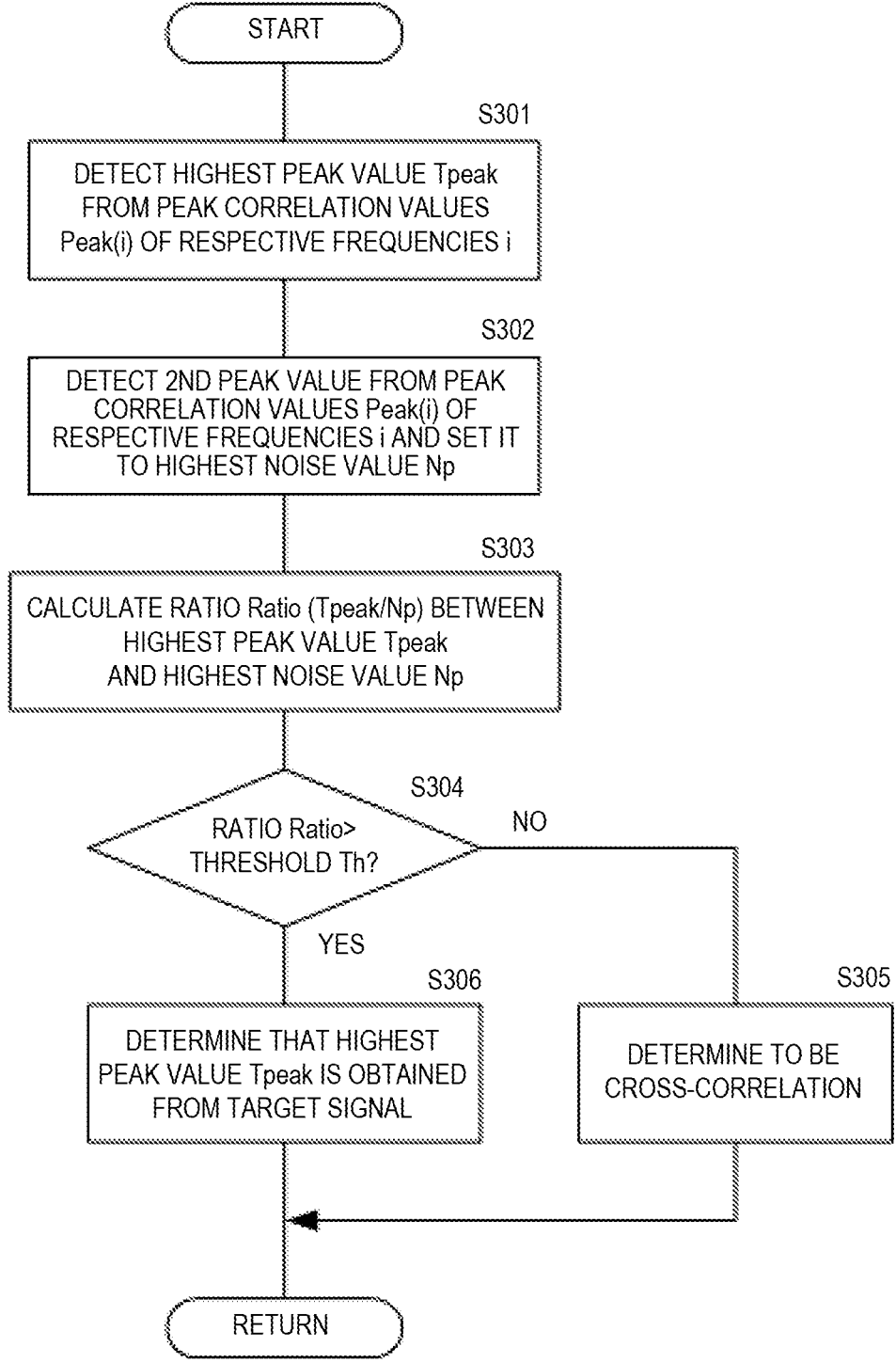
FIG. 6 is a flowchart illustrating a flow for determining the target GPS signal and the cross-correlation.

As described above, the acquired peak correlation values Peak(i) of the respective frequencies i are compared to each other to perform the determination of cross-correlation (S103). FIG. 6 is a flowchart illustrating a flow for determining the target GPS signal and cross-correlation.

First, the acquired peak correlation values Peak(i) of the respective frequencies i are compared to each other, and a highest value thereof is detected as a highest peak value Tpeak (S301).

Next, the peak correlation values Peak(i) of the respective frequencies i are compared to each other, and a peak correlation value Peak(i) that is a second highest value thereamong is set to be a highest noise value Np (S302). In other words, among the peak correlation values Peak(i) of the respective frequencies i, the peak correlation value Peak(i) that becomes the highest value except for the highest peak value Tpeak is set to be the highest noise value Np.

Next, a ratio Ratio between the highest peak value Tpeak and the highest noise value Np is calculated based on an operation formula of Tpeak/Np (S303).

Next, a preset threshold Th and the ratio Ratio are compared to each other, and if the ratio Ratio is higher than the threshold Th (S304: YES), the highest peak value Tpeak is determined to be obtained from the target GPS signal (S306). On the other hand, if the ratio Ratio is lower than the threshold Th (S304: NO), the group of these peak correlation values Peak(i) is determined to be obtained from cross-correlation (S305).

Specifically, in the example of FIG. 4(A), the peak correlation value Peak(2) of the frequency $F_{sig}012$ is set to be the highest peak value Tpeak. The peak correlation value Peak(4) of the frequency $F_{sig}014$ is set to be the highest noise value Np. The ratio Ratio (Tpeak/Np) becomes Peak(2)/Peak(4). Here, as described above, according to the correlation property of the GPS signal, the peak correlation value Peak(2) is significantly higher than the peak correlation value Peak(4). Therefore, the ratio Ratio becomes an extremely high positive value.

Also in the example of FIG. 4(B), the peak correlation value Peak(2) of the frequency $F_{sig}012$ is set to be the highest peak value Tpeak. The peak correlation value Peak(4) of the frequency $F_{sig}014$ is set to be the highest noise value Np. The ratio Ratio (Tpeak/Np) becomes Peak(2)/Peak(4). However, as described above, when cross-correlation occurs, the peak correlation value Peak(2) and the other peak correlation values Peak including the peak correlation value Peak(4) become substantially the same value. Therefore, the ratio becomes approximately 1:1.

Therefore, if the threshold Th is set to a predetermined positive value of about 2:1 to 3:1 for example, when the reception signal is the GPS signal, the ratio Ratio becomes higher than the threshold Th, and the highest peak value Tpeak can be accurately determined to be obtained from the target GPS signal. On the other hand, when cross-correlation occurs, the ratio Ratio becomes lower than the threshold Th, and it can be determined that cross-correlation occurred.

Thus, whether the signal is the target GPS signal or cross-correlation is determined, and if it is determined that the integrated correlation value is obtained from the target GPS signal (S104: NO), by acquiring the frequency and the code phase at which the integrated correlation value being the highest peak value Tpeak, the target GPS signal is captured (S105) and the flow proceeds to tracking.

Here, if cross-correlation is determined to have occurred (S104: YES), each frequency forming the group is shifted by 50 Hz, in other words, the group is shifted so that the determination of cross-correlation that starts by acquiring the integrated correlation values described above is similarly performed. This processing is performed continuously and repeatedly until the target GPS signal is captured. However, in a case where the target GPS signal cannot be obtained even when the entire scanning band is scanned a predetermined number of times (e.g., twice or three times), for example, processing of displaying that the target GPS signal was not able to be captured or the like may be performed. Note that, in this embodiment, the example of shifting the frequency by 50 Hz is given; however, the frequency may be shifted by a different frequency (e.g., 100 Hz) according to, for example, a resource amount for performing the calculation and a required capturing speed.

As described above, by using the signal searching method of this embodiment, cross-correlation can accurately be determined and the target GPS signal can be captured accurately and surely.

Further, by using the method of this embodiment, through the process of calculating the highest integrated correlation value of each frequency which is discretely set (highest correlation value of each frequency) and further detecting the highest integrated correlation value and the second highest integrated correlation value for cross-correlation determination among the plurality of highest correlation values of the respective frequencies, the determination of cross-correlation can be performed. In other words, the highest value detection is not required to be performed twice over the entire code phase axis as described in the conventional arts, and the processing is simplified. For example, when scanning over the code phases of 1,023 chips with the resolution of 0.5 chip, in the conventional examples, the integrated correlation value needs to be acquired $1,023 \times 2 \times 2 = 4,092$ times, and when acquiring this for eight different frequencies, the integrated correlation value needs to be acquired $4,092 \times 8 = 32,736$ times. On the other hand, with the method of this embodiment, the acquisition is performed $1,023 \times 2 = 2,046$ times for a single frequency, and $2,046 \times 8 = 16,368$ times for the eight frequencies. Further, the scanning is performed eight times for determining the highest peak correlation value and seven times for determining the second highest peak correlation values, from the integrated correlation values of the eight frequencies. Therefore, the number of acquisitions becomes $16,368 + 8 + 7 = 16,383$ times and only about half of 32,736 times in the conventional case is required. Additionally, in this embodiment, since each processing on the integrated correlation value is performed for the independent eight frequencies in parallel to each other, speedier processing can be achieved.

Moreover, in the conventional arts, a range needs to be limited on the code phase axis so as to find the second correlation peak existing on the code phase axis; however, in this embodiment, the limitation is not needed to be provided to determine the second peak correlation value among the peak correlation values of the plurality of frequencies independent from one another, and simpler processing than the conventional arts becomes available.

Moreover, when a navigation message is already acquired and information of the target GPS signal is obtained from the navigation message, the scanning range on the code phase axis can be narrowed with both of the conventional arts and the method of this embodiment; however, with the conventional arts, as described above, the case where the true second peak correlation value is not within the scanning range can be considered, and the determination accuracy of cross-correlation may degrade. However, with the method of this embodiment, the highest integrated correlation values are acquired on the code phase axis of each frequency and, among these highest integrated correlation values with the plurality of frequencies independent from one another, the highest peak value and the second peak correlation value (highest noise value) are obtained; therefore, the true second peak correlation value (integrated correlation value) required for performing the determination of cross-correlation can be obtained, and the determination accuracy of cross-correlation does not degrade.

As described above, by using the method of this embodiment, cross-correlation can accurately be determined and the target GPS signal can accurately be captured while using simpler processing than the conventional arts.

Figure 7:
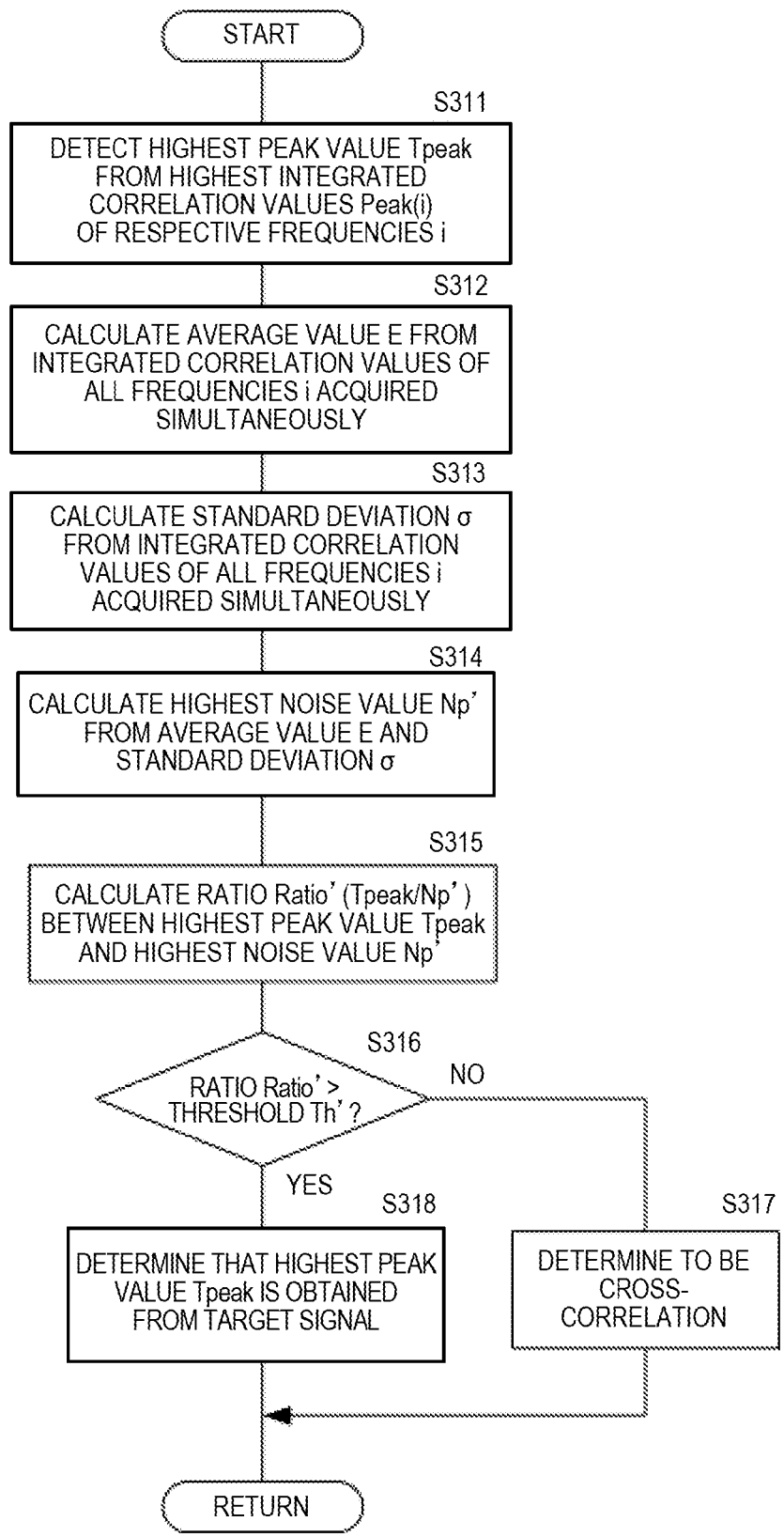
FIG. 7 is a flowchart illustrating a flow for determining the target GPS signal and the cross-correlation when an average value and a standard deviation are used.

Note that, in the above description, the example of using the second peak correlation value as the highest noise value Np is given; however, as described next, a highest noise value Np' may be set based on an average value and a standard deviation of the peak correlation values Peak(i) of the respective frequencies i. FIG. 7 is a flowchart illustrating a flow for determining the target GPS signal and the cross-correlation when the average value and the standard deviation are used.

First, the peak correlation values Peak(i) of the respective frequencies i are compared to each other, and the highest value thereof is detected as the highest peak value Tpeak (S311).

Next, an average value E of the integrated correlation values of all the frequencies i (i=1 to 8) acquired simultaneously is calculated (S312). For example, in the eight frequency simultaneous processing described above, when the integrated correlation values are acquired for 1,023 chips with the resolution of 0.5 chip, $1,023 \times 2 \times 8 = 16,368$ of integrated correlation values are added and this added value is divided by the parameter 16,368 to calculate the average value E.

Next, a standard deviation σ of the integrated correlation values of all the frequencies i (i=1 to 8) acquired simultaneously is calculated (S313). For example, in the eight frequency simultaneous processing described above, when the integrated correlation values are acquired for 1,023 chips with the resolution of 0.5 chip, a sum of squares of $1,023 \times 2 \times 8 = 16,368$ of integrated correlation values is calculated, the sum of squares is divided by the parameter 16,368 and is subtracted by a square of the average value E described above. Then, by taking a square root of the subtraction result, the standard deviation σ is calculated.

Next, the highest noise value Np' is calculated based on the average value E and the standard deviation σ (S314). The highest noise value Np' is calculated by multiplying the standard deviation σ by a constant N and adding the multiplication result with the average value E, i.e., it is obtained based on Np'=E+Nσ. Here, N is a constant set according to the scanning range in the code phase axial direction.

For example, N is set such that it becomes smaller as the scanning range becomes wider and it becomes larger as the scanning range becomes narrower. As a specific example, N=4 is set when the entire code phase range (1,023 chips) is set as the scanning range, and N=5 is set when the one-fourth of the entire code phase range (256 chips) is set as the scanning range.

By setting the constant N as above according to the scanning range, influence on noise calculation error depending on the number of samples (the size of the scanning range) can be suppressed and the highest noise value Np' that is highly reliable even when the scanning range is changed can be set.

Next, a ratio Ratio' between the highest peak value Tpeak and the highest noise value Np' is calculated based on an operation formula of Tpeak/Np' (S315).

Subsequently, a preset threshold Th' and the ratio Ratio' are compared to each other, and if the ratio Ratio' is higher than the threshold Th' (S316: YES), the highest peak value Tpeak is determined to be obtained from the target GPS signal (S318). On the other hand, if the ratio Ratio' is lower than the threshold Th' (S316: NO), the group of these peak correlation values Peak(i) is determined to be obtained from cross-correlation (S317).

By using the method of setting the highest noise value Np' that is obtained using the average value E and the standard deviation σ, the statistical reliability of the highest noise value can be improved. Therefore, cross-correlation can be determined more accurately.

Figure 8:
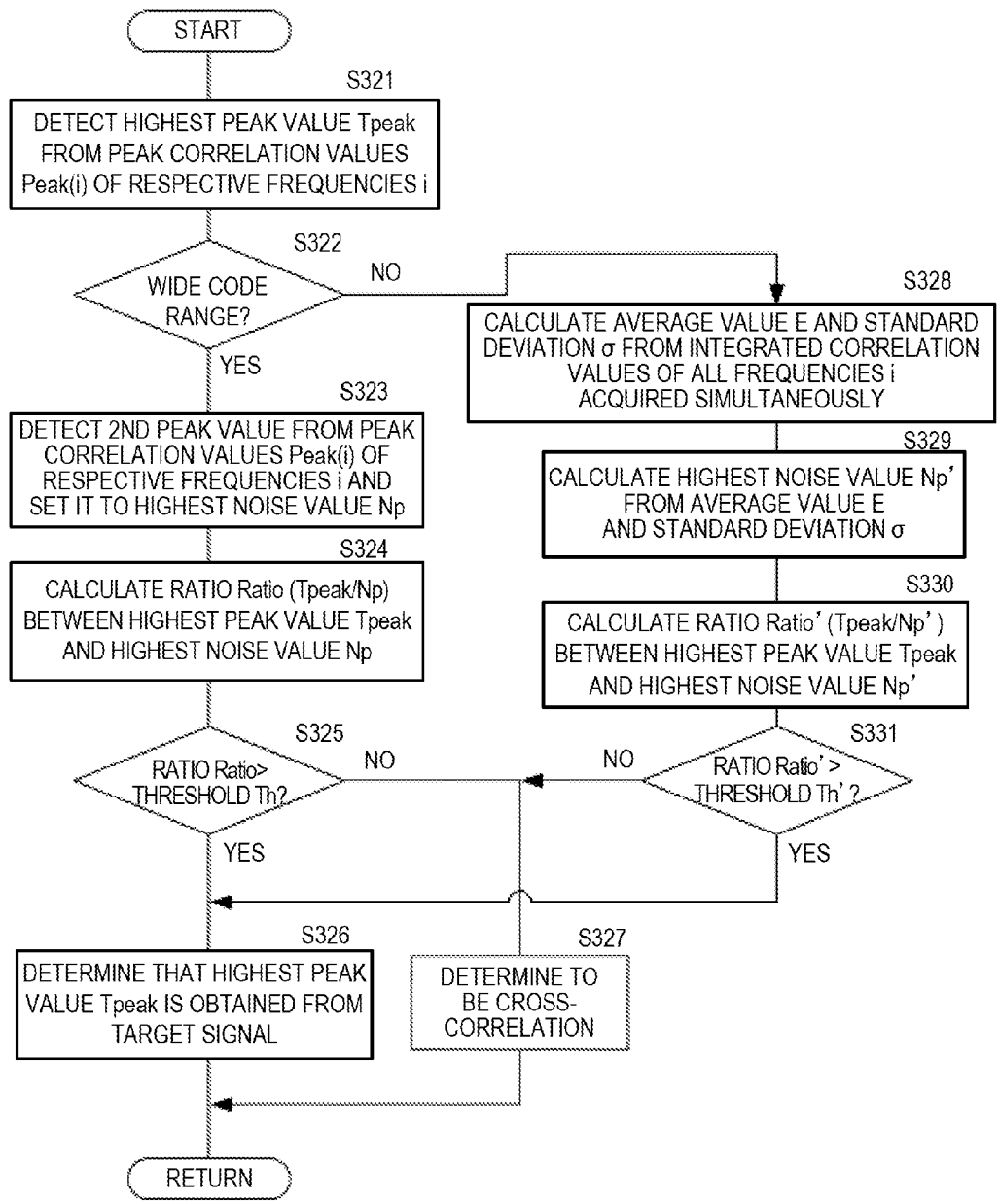
FIG. 8 is a flowchart illustrating a flow for determining the target GPS signal and the cross-correlation when two kinds of maximum noise values are switched to be used.

Note that, the two kinds of setting methods of the highest noise value can be utilized in combination. FIG. 8 is a flowchart illustrating a flow for determining the target GPS signal and the cross-correlation when the two kinds of maximum noise values are switched to be used.

First, the peak correlation values Peak(i) of the respective frequencies i are compared to each other, and these highest values are detected as the highest peak value Tpeak (S321).

When the scanning range of the code phase is acquired and the scanning range of the code phase is wide (e.g., the full code of 1,023 chips) (S322: YES), the peak correlation values Peak(i) of the respective frequencies i are compared to each other and a second highest peak correlation value Peak(i) thereamong is set to be the highest noise value Np (S323).

Subsequently, the ratio Ratio between the highest peak value Tpeak and the highest noise value Np is calculated based on the operation formula of Tpeak/Np (S324).

Next, the preset threshold Th and the ratio Ratio are compared to each other, and if the ratio Ratio is higher than the threshold Th (S325: YES), the highest peak value Tpeak is determined to be obtained from the target GPS signal (S326). On the other hand, if the ratio Ratio is lower than the threshold Th (S325: NO), the group of these peak correlation values Peak(i) is determined to be obtained from cross-correlation (S327).

When the scanning range of the code phase is acquired and the scanning range of the code phase is narrow (e.g., one-fourth of the full code of 1,023 chips (256 chips)) (S322: NO), the average value E and the standard deviation σ of the integrated correlation values of all the frequencies i (i=1 to 8) acquired simultaneously are calculated (S328). As the calculation method of the average value E and the standard deviation σ of the integrated correlation values, the same method as described above is used.

Subsequently, the highest noise value Np' is calculated based on the average value E and the standard deviation σ (S329). The highest noise value Np' is calculated by multiplying the standard deviation σ by the constant N and adding the multiplication result with the average value E, i.e., it is obtained based on Np'+E+Nσ. Here, N is a constant set according to the scanning range in the code phase axial direction.

Next, the ratio Ratio' between the highest peak value Tpeak and the highest noise value Np' is calculated based on the operation formula of Tpeak/Np' (S330).

Subsequently, the preset threshold Th' and the ratio Ratio' are compared to each other, and if the ratio Ratio' is higher than the threshold Th' (S331: YES), the highest peak value Tpeak is determined to be obtained from the target GPS signal (S326). On the other hand, if the ratio Ratio' is lower than the threshold Th' (S331: NO), the group of these peak correlation values Peak(i) is determined to be obtained from cross-correlation (S327).

In the case of using such two setting methods of the highest noise value in combination, since the peak correlation value which is the second highest value is used when the parameter is large, in the setting of the highest noise value, the influence of the large parameter is not easily received. Further, since the parameter is large, even when the peak correlation value which is the second highest value is set to be the highest noise value, this value is sufficiently reliable. Whereas, when the parameter is small, since the highest noise value is set with the statistic method using the average value E and the standard deviation σ, the degradation of the reliability of the highest noise value due to the small parameter can be suppressed. Therefore, with the method using the two setting methods of the highest noise value in combination, the determination of cross-correlation can be performed while keeping the reliability of the highest noise value and without increasing an operation load much.

Meanwhile, with the signal searching method described above, the integrating time period for calculating the correlation values is not particularly defined in detail and is fixed without depending on the frequency. However, when the GPS signal currently tracked already exists, as described next, the integrating time period may be set individually for every group.

A signal searching method according to an embodiment of this disclosure is described with reference to the drawings. Note that, in this embodiment, the signal searching method of a GPS signal transmitted from a GPS satellite is described. Moreover, in this embodiment, for the sake of simplifying the description, a case where the number of the GPS signals being tracked is one at a start timing of the signal search is described.

Figure 9:
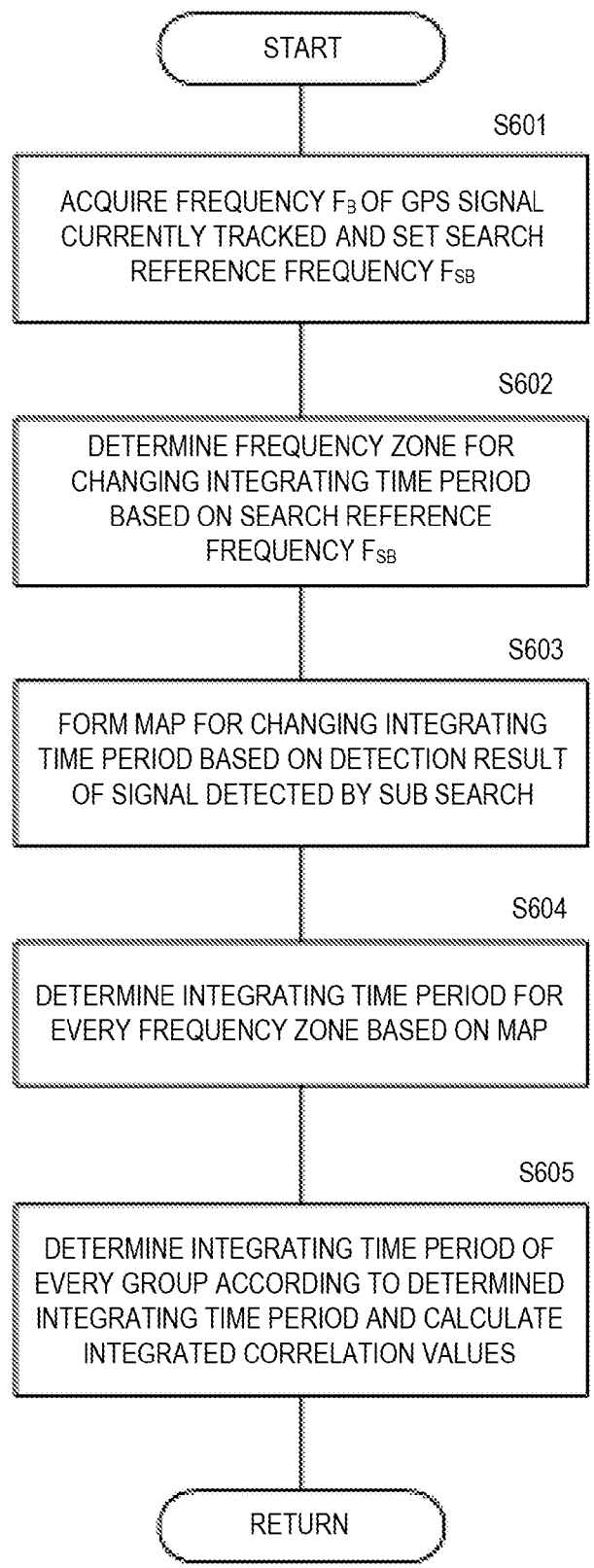
FIG. 9 is a flowchart of an integrated correlation value calculating method of this embodiment.

FIG. 9 is a flowchart of the integrated correlation value calculation method of this embodiment. As illustrated in FIG. 9, with the signal searching method of this embodiment, first, a frequency $F_B$ of the GPS signal currently tracked is acquired and set to be a search reference frequency $F_{SB}$ (S601). The search reference frequency $F_{SB}$ is comprised of the acquired frequency $F_B$ of the GPS signal currently tracked, and frequencies that exist within the above-described frequency range of 8 kHz with reference to the frequency $F_B$ and are set at 1,000 Hz intervals. This search reference frequency $F_{SB}$ corresponds to the frequency with which the maximum integrated correlation value obtained from cross-correlation is produced during the signal searching of this embodiment.

Figure 10:
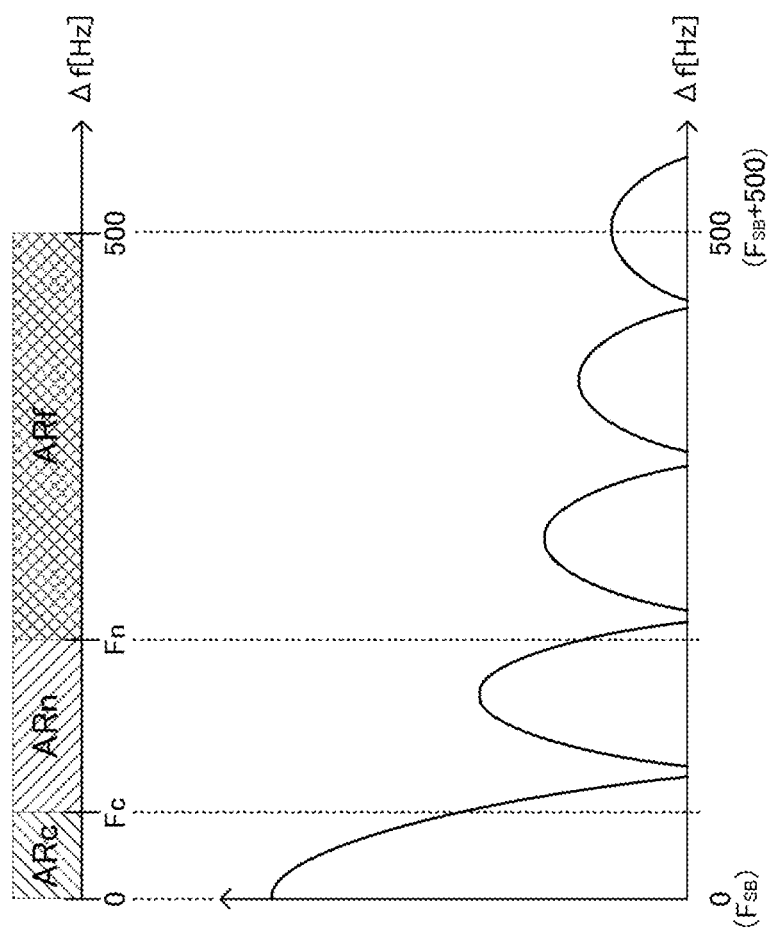
FIG. 10 is a chart for describing a setting concept of a frequency zone.

Next, a frequency zone is determined as illustrated in FIG. 10 based on the search reference frequency $F_{SB}$ by utilizing such an integrated correlation value property peculiar to cross-correlation (S602). FIG. 10 is a chart for describing a setting concept of the frequency zone.

As illustrated in FIG. 10, with the signal searching method of this embodiment, by using the search reference frequency $F_{SB}$ as the reference frequency (0 Hz), a frequency range from the reference frequency to 500 Hz away therefrom is set, divided into a first frequency zone ARc, a second frequency zone ARn, and a third frequency zone ARf.

The first frequency zone ARc, conceptually, is a frequency zone that most easily receives the influence of cross-correlation and is extremely close to the frequency of cross-correlation. The first frequency zone ARc is set in a frequency band from the reference frequency to a first threshold frequency Fc.

The second frequency zone ARn, conceptually, is a frequency zone that has a possibility of receiving the influence of cross-correlation to some extent and is more away from the frequency of cross-correlation compared to the extremely close zone but is close thereto to some extent. The second frequency zone ARn is set in a frequency band from the first threshold frequency Fc to a second threshold frequency Fn (<Fc).

The third frequency zone ARf, conceptually, is a frequency zone that hardly receives the influence of cross-correlation and is separated from the frequency of cross-correlation. The third frequency zone ARf is set in a frequency band of 500 Hz from the second threshold frequency Fn.

Note that, the first threshold frequency Fc and the second threshold frequency Fn are suitably set based on an integrating period of time. For example, the first threshold frequency Fc is set so that the frequency band substantially corresponding to a main lobe of cross-correlation becomes the first frequency zone ARc. Moreover, the second threshold frequency Fn is set so that the frequency band substantially corresponding to a side lobe adjacent to the main lobe becomes the second frequency zone ARn.

Further, if the integrating time period is changed, a width of each lobe configuring the correlation property of cross-correlation changes. Therefore, the first threshold frequency Fc and the second threshold frequency Fn may be changed corresponding to this change of the correlation property. For example, when the integrating time period becomes longer, since the widths of the main lobe and the side lobe become narrower, the first threshold frequency Fc and the second threshold frequency Fn may be set to smaller values, respectively.

Figure 12:
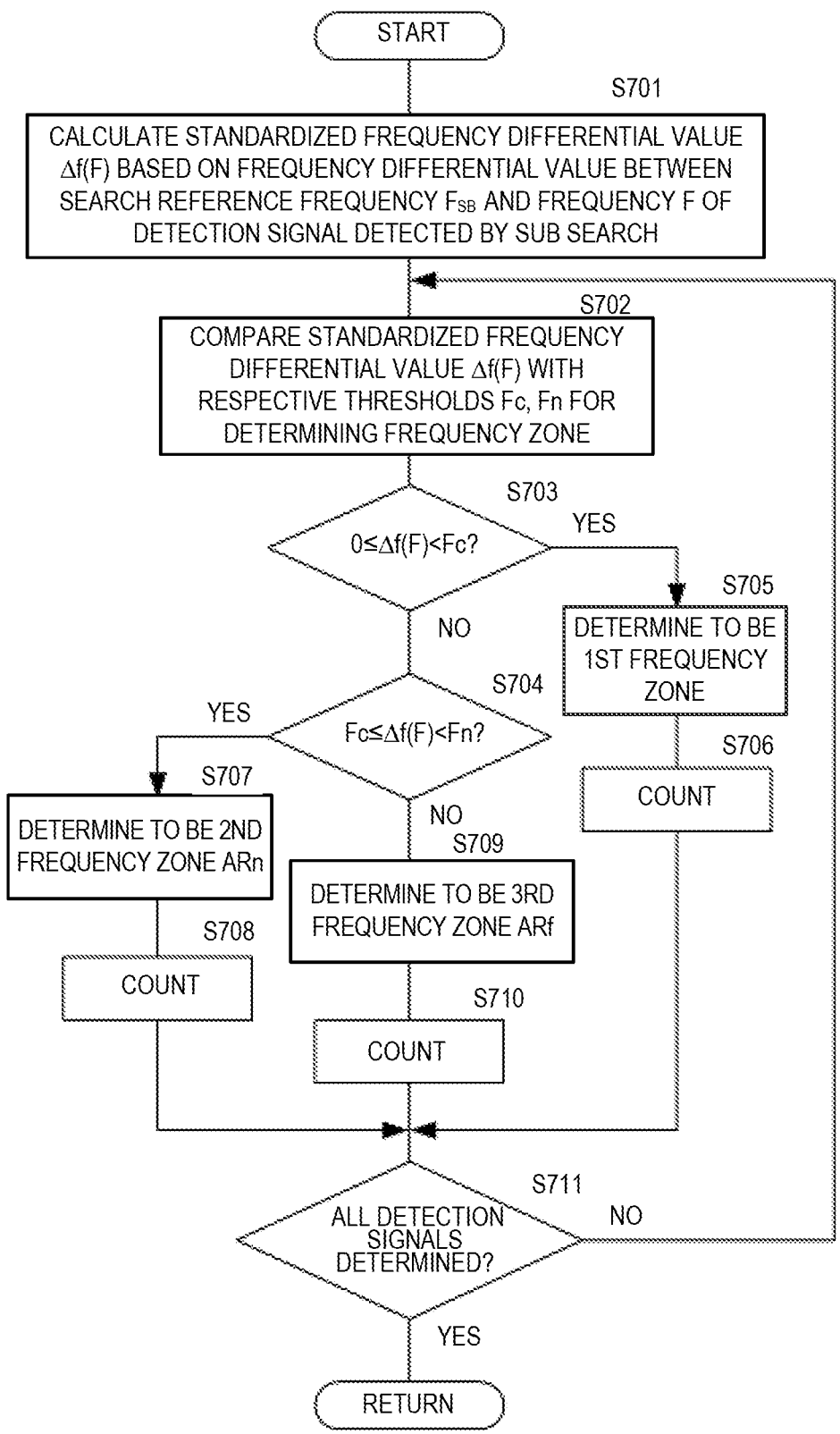
FIG. 12 is a flowchart of a forming process in an integrating time period changing map.

Next, with the signal searching method of this embodiment, a frequency of a sub detection signal detected by a sub search is acquired, and a map for changing the integrating time period as illustrated in FIG. 11 is formed (S603). FIG. 11 is a table illustrating one example of the integrating time period setting map. Moreover, FIG. 12 is a flowchart of a forming process of the integrating time period changing map.

When a frequency F of the sub detection signal detected by the sub search is acquired, a differential value between the frequency F of the sub detection signal and the search reference frequency $F_{SB}$ (frequency differential value Df(F)) is calculated. Here, if a plurality of sub detection signals exist, the frequency differential value Df(F) is calculated for every individual sub detection signal (S701).

The frequency differential value Df(F) of the sub detection signal is obtained based on the following equation.

$$Df(F)=(ABS(F-F_{SB}))/1{,}000 \text{ [Hz]},$$

wherein ABS( ) is a sign expressing an absolute value calculation.

Next, the frequency differential value of the sub detection signal is standardized so that it becomes a value between 0 Hz and 500 Hz, so as to calculate a standardized frequency differential value $\Delta f(F)$. The standardized frequency differential value $\Delta f(F)$ of the sub detection signal is obtained based on the following equations. Note that, Mod( ) is a sign expressing a remainder.

If $\text{Mod}(Df(F))\geq 500$ [Hz]

$\Delta f(F)=ABS(Df(F)-1{,}000)$

Else $\text{Mod}(Df(F))<500$ [Hz]

$\Delta f(F)=\text{Mod}(Df(F))$

The standardized frequency differential value $\Delta f(F)$ of each sub detection signal calculated as above is compared to the first threshold frequency Fc and the second threshold frequency Fn (S702).

If the standardized frequency differential value $\Delta f(F)$ of each sub detection signal is lower than the first threshold frequency Fc (S703: YES), the sub detection value is determined to be within the first frequency zone ARc (S705), and the number of sub detection signals within the first frequency zone ARc is incremented by one (S706).

If the standardized frequency differential value $\Delta f(F)$ of the sub detection signal is higher than the first threshold frequency Fc (S703: NO) but is lower than the second threshold frequency Fn (S704: YES), the sub detection signal is determined to be within the second frequency zone ARn (S707), and the number of sub detection signals within the second frequency zone ARn is incremented by one (S708).

If the standardized frequency differential value $\Delta f(F)$ of the sub detection signal is higher than the first threshold frequency Fc (S703: NO) but is higher than the second threshold frequency Fn (S704: NO), the sub detection signal is determined to be within the third frequency zone ARf (S709), and the number of sub detection signals within the third frequency zone ARf is incremented by one (S710).

Such processing of determining which frequency zone the sub detection signal corresponds to is performed for all the sub detection signals (S711: YES), and when the sub detection signal on which the determination is not performed exists (S711: NO), the processing from S702 described above is repeated until the determination on all the sub detection signals is completed.

By performing such processing, the map of the numbers of sub detection signals existing within the first frequency zone ARc, the second frequency zone ARn, and the third frequency zone ARf, respectively, is formed (see FIG. 11).

Next, an integrating time period Tc in the first frequency zone ARc, an integrating time period Tn in the second frequency zone ARn, and an integrating time period Tf in the third frequency zone ARf are set based on the map (S604), the integrated correlation values are calculated by integrating the correlation value for the set integrating time period (S605).

Here, as illustrated in FIG. 11, when the sub detection signals exist within both of the first frequency zone ARc and the second frequency zone ARn, the integrating period of time Tc in the first frequency zone ARc, the integrating period of time Tn of the second frequency zone ARn, and the integrating period of time Tf of the third frequency zone ARf are set to have a relationship of Tc>Tn>Tf.

By such setting, the integrating time period is set to be longer for the frequency zone that is easier to receive the influence of cross-correlation. Here, as it can be understood from the correlation property of cross-correlation reaching its peak more dramatically as the integrating time period becomes longer, the resolution in the signal detection on the frequency axis improves more as the integrating time period is extended.

Therefore, by setting the integrating time period as this embodiment, even for the frequency band extremely close to the peak frequency of cross-correlation or for the frequency band close to the peak frequency of cross-correlation, the influence of cross-correlation is reduced suitably according to the respective frequency zones, the target GPS signal can be detected more accurately and captured.

Thus, when the frequency zone and the integrating time period are set, which one of frequency zones described above each search frequency $F_{sig}$ corresponds to is determined and the integrating time period of the search frequency $F_{sig}$ is determined. Here, since the search frequencies $F_{sig}$ configuring the group Gr as described above exist at 1,000 Hz intervals, differences of all the search frequencies $F_{sig}$ included in a single group Gr from the search reference frequency $F_{SB}$ are the same as each other.

Figure 13:
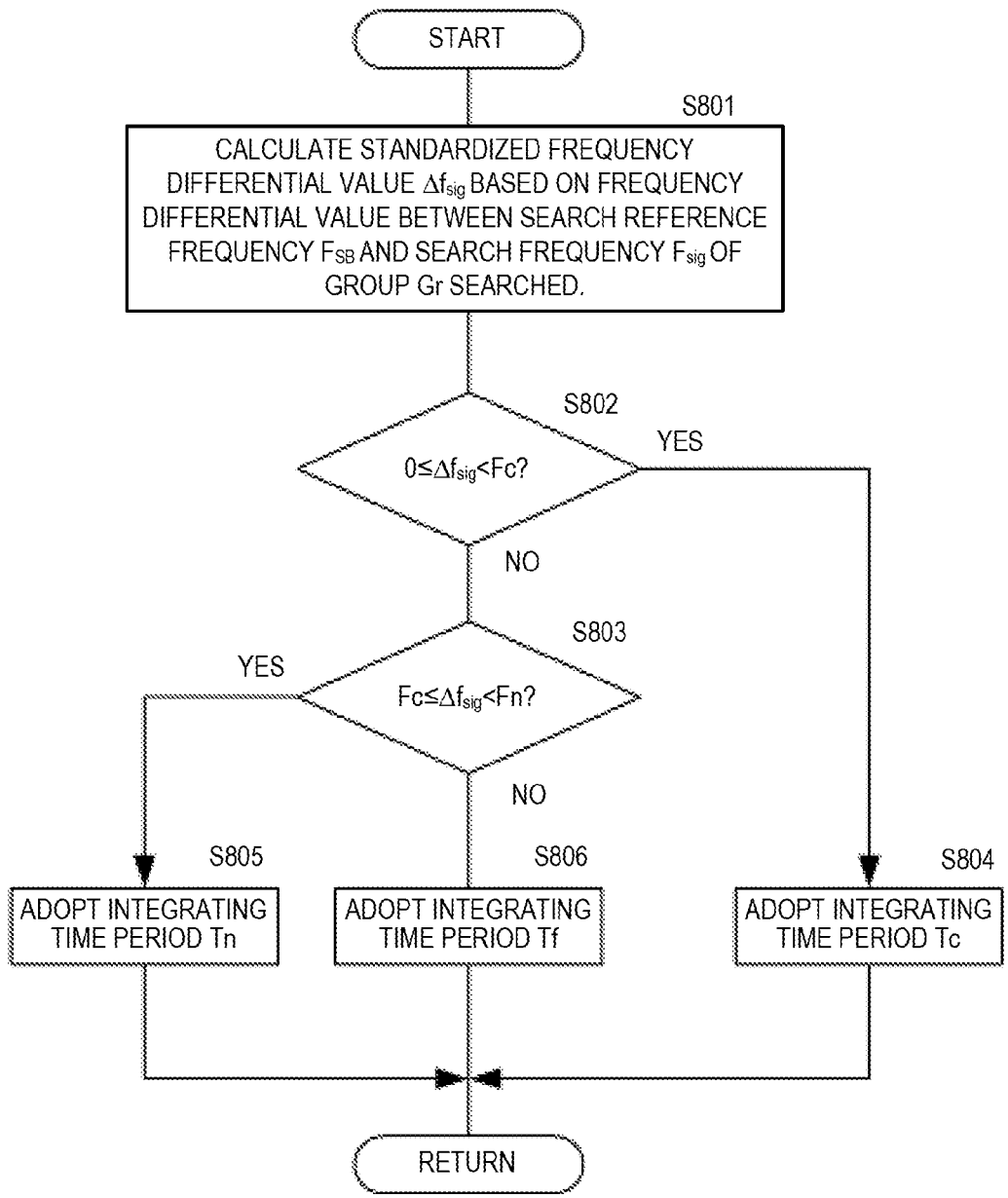
FIG. 13 is a flowchart illustrating determination of the frequency zone and setting of the integrating time period.

Therefore, the determination of the integrating time period for all the search frequencies $F_{sig}$ included in the single group Gr may be performed on a single search frequency $F_{sig}$, and the determined integrating time period may also be set for the other search frequencies $F_{sig}$ in the same group Gr. FIG. 13 is a flowchart illustrating the determination of the frequency zone and the setting of the integrating time period.

A frequency differential value Df between the search reference frequency $F_{sig}$ and one of the search frequencies $F_{sig}$ that represents the group Gr is calculated and a standardized frequency differential value $\Delta f_{sig}$ is calculated (S801). Specifically, similar processing to the standardized frequency differential value $\Delta f(F)$ of the sub detection signal described above is performed.

The frequency differential value Df between the search reference frequency $F_{sig}$ and one of the search frequencies $F_{sig}$ that represents the group Gr is calculated.

The frequency differential value Df is obtained based on the following equation.

$$Df=(ABS(F_{sig}-F_{SB}))/1000 \text{ [Hz]}$$

Next, the frequency differential value is standardized such that it becomes a value between 0 Hz and 500 Hz, so as to calculate the standardized frequency differential value $\Delta f_{sig}$. The standardized frequency differential value $\Delta f_{sig}$ is obtained based on the following equations.

If Mod($Df$)≥500 [Hz]

$\Delta f_{sig}$=ABS($Df$-1000)

Else Mod($Df$)<500 [Hz]

$\Delta f_{sig}$=Mod($Df$)

The standardized frequency differential value $\Delta f_{sig}$ of the search frequency $F_{sig}$ calculated as above is compared to the first threshold frequency Fc described above (S802).

If the standardized frequency differential value $\Delta f_{sig}$ is lower than the first threshold frequency Fc (S802: YES), the search frequency $F_{sig}$ is determined to be within the first frequency zone ARc and the integrating time period Tc is adopted to the search frequency $F_{sig}$ (S804).

If the standardized frequency differential value $\Delta f_{sig}$ is higher than the first threshold frequency Fc (S802: NO), the standardized frequency differential value $\Delta f_{sig}$ of the search frequency $F_{sig}$ is compared to the second threshold frequency Fn described above (S803).

If the standardized frequency differential value $\Delta f_{sig}$ is lower than the second threshold frequency Fn (S803: YES), the search frequency $F_{sig}$ is determined to be within the second frequency zone ARn and the integrating time period Tn is adopted to the search frequency $F_{sig}$ (S805).

If the standardized frequency differential value $\Delta f_{sig}$ is higher than the second threshold frequency Fn (S803: NO), the search frequency $F_{sig}$ is determined to be within the third frequency zone ARf and the integrating time period Tf is adopted to the search frequency $F_{sig}$ (S806).

Thus, an integrated value corresponding to the separation of the search frequency $F_{sig}$ from the peak frequency of cross-correlation is set.

Figure 14:
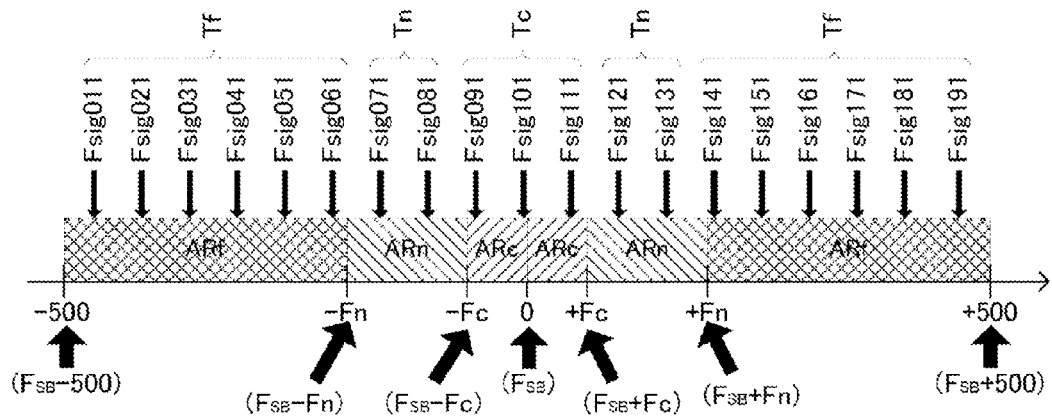
FIG. 14 is a view for describing a determination concept of the frequency zone and a setting concept of the integrating time period.

Specifically, as described above, in the case of shifting the search frequency by an interval of 50 Hz for every group, the search frequencies $F_{sig}011$, $F_{sig}021$, $F_{sig}031$, $F_{sig}041$, $F_{sig}051$, $F_{sig}061$, $F_{sig}071$, $F_{sig}081$, $F_{sig}091$, $F_{sig}101$, $F_{sig}111$, $F_{sig}121$, $F_{sig}131$, $F_{sig}141$, $F_{sig}151$, $F_{sig}161$, $F_{sig}171$, $F_{sig}181$ and $F_{sig}191$ representing the respective groups Gr1 to Gr18 are set as FIG. 14. FIG. 14 is a view for describing a determination concept of the frequency zone and a setting concept of the integrating time period. Note that, in FIG. 14, an example where the search frequency $F_{sig}011$ is the farthest frequency from the peak frequency of cross-correlation is illustrated.

In the example of FIG. 14, the search frequencies $F_{sig}011$, $F_{sig}021$, $F_{sig}031$, $F_{sig}041$, $F_{sig}051$ and $F_{sig}061$ correspond to the third frequency zone ARf. The search frequencies $F_{sig}071$ and $F_{sig}081$ correspond to the second frequency zone ARn. The search frequencies $F_{sig}091$, $F_{sig}101$ and $F_{sig}111$ correspond to the first frequency zone ARc. The search frequencies $F_{sig}121$ and $F_{sig}131$ correspond to the second frequency zone ARn. The search frequencies $F_{sig}141$, $F_{sig}151$, $F_{sig}161$, $F_{sig}171$, $F_{sig}181$ and $F_{sig}191$ correspond to the third frequency zone ARf.

Therefore, the integrating time period Tf is adopted to the search frequencies $F_{sig}011$, $F_{sig}021$, $F_{sig}031$, $F_{sig}041$, $F_{sig}051$ and $F_{sig}061$ and the search frequencies $F_{sig}141$, $F_{sig}151$, $F_{sig}161$, $F_{sig}171$, $F_{sig}181$ and $F_{sig}191$. The integrating time period Tn is adopted to the search frequencies $F_{sig}071$ and $F_{sig}081$ and the search frequencies $F_{sig}121$ and $F_{sig}131$. The integrating time period Tc is adopted to the search frequencies $F_{sig}091$, $F_{sig}101$ and $F_{sig}111$.

Based on this result, the integrating time periods of all the search frequencies $F_{sig}$ which belong to the groups Gr1, Gr2, Gr3, Gr4, Gr5, Gr6, Gr14, Gr15, Gr16, Gr17, Gr18 and Gr19 respectively including the search frequencies $F_{sig}011$, $F_{sig}021$, $F_{sig}031$, $F_{sig}041$, $F_{sig}051$ and $F_{sig}061$ and the search frequencies $F_{sig}141$, $F_{sig}151$, $F_{sig}161$, $F_{sig}171$, $F_{sig}181$ and $F_{sig}191$, are set to Tf.

The integrating time periods of all the search frequencies $F_{sig}$ which belong to the groups Gr7, Gr8, Gr12 and Gr13 respectively including the search frequencies $F_{sig}071$ and $F_{sig}081$ and the search frequencies $F_{sig}121$ and $F_{sig}131$, are set to Tn.

The integrating time periods of all the search frequencies $F_{sig}$ which belong to the groups Gr9, Gr10 and Gr11 respectively including the search frequencies $F_{sig}091$, $F_{sig}101$ and $F_{sig}111$, are set to Tc.

According to the integrating time period set as above, the correlation is performed with each search frequency, and the integrated correlation values corresponding to the integrating time period are calculated.

By performing such processing, as described above, the influence of cross-correlation is suitably reduced corresponding to the frequency zone, and the signal searching performance can be improved compared to the conventional methods.

Moreover, by setting the integrating time periods Tn and Tf of the second and third frequency zones ARn and ARf where the influence of cross-correlation is not easily received, to be shorter than the integrating time period Tc of the first frequency zone where the influence of cross-correlation is easily received, in the entire frequency band, the signal searching time period for a single channel can be shortened compared to the case of adopting the integrating time period Tc of the first frequency zone where the influence of cross-correlation is easily received.

As described above, by using the integrated correlation value calculation method of this embodiment, the GPS signal can be captured in a shorter period of time than the conventional methods without causing false capturing due to cross-correlation.

Note that, in the description above, the example of setting the integrating time periods Tc, Tn and Tf according to the counted number of the sub detection signals is given; however, without taking the counted number into consideration, for every frequency zone, the integrating time period may be longer in the order from the zone closest to the peak frequency of cross-correlation. By such setting of the integrating time period, the sub search is not required. However, in the case of setting the integrating time period according to the counted number, when the sub detection signal does not exist, setting of, for example, shortening the integrating time period Tn of the second frequency zone ARn and the integrating time period Tf of the third frequency zone ARf similarly to each other, or evenly shortening each integrating time period, can be performed, and according to the situation, more optimal setting of the integrating time period can be performed.

Figure 15:
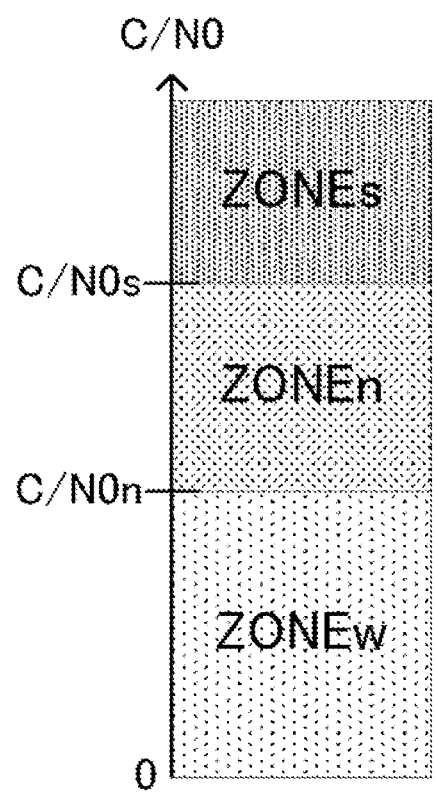
FIG. 15 is a view for describing a setting concept of signal intensity zones.

Moreover, in the above description, the example of setting the integrating time period based only on the separation amount from the peak frequency of cross-correlation (search reference frequency $F_{SB}$) is given; however, the integrating time period may be set by also using a signal intensity of the sub detection signal. FIG. 15 is a view for describing a setting concept of signal intensity zones. FIG. 16 is a table illustrating one example of an integrating time period setting map including the signal intensity zones.

As illustrated in FIG. 15, three levels of signal intensity zones are set according to a C/No of the sub detection signal. Specifically, a zone lower than a first threshold C/N0n is set to be a first signal intensity zone ZONEw, a zone higher than the first threshold C/N0n and lower than a second threshold C/N0s is set to be a second signal intensity zone ZONEn, and a zone higher than the second threshold C/N0s is set to be a third signal intensity zone ZONEs.

When the sub detection signal is acquired, the C/N0 is detected for every sub detection signal, and which signal intensity zone the sub detection signal corresponds to is determined.

By performing such processing, in combination to the determination result of the frequency zone described above, an integrating time period setting map as illustrated in FIG. 16 can be formed.

Further, in each frequency zone, with reference to a distribution of the sub detection signal corresponding to each signal intensity zone, the integrating time period of each frequency zone is set. For example, as illustrated in FIG. 16, if it is found that the sub detection signal with high C/N0 exists in the first frequency zone ARc, there is a high possibility that the sub detection signal is the currently-tracked GPS signal which produces the peak frequency caused by cross-correlation, and therefore, the integrating time period may be corrected to be longer so that the influence of the currently-tracked GPS signal is less easily received.

Thus, further according to the reception situation, more suitable integrating time period can be set, and the false capturing due to cross-correlation can be suppressed more.

Note that, in the above description, the example of the case of cross-correlation of the GPS signal is given; however, this embodiment can similarly be applied to capturing another GNSS signal. Moreover, also for capturing a wireless communication signal in which a correlation value reaches its peak at frequency intervals determined based on a cycle of a diffusion code for modulating the target signal, this embodiment can similarly be applied.

Moreover, in the setting of the frequency zone described above, the example of setting the three frequency zones is described; however, the frequency zone can be set into two or more frequency zones. Similarly, also the signal intensity zone can also be set into two or more signal intensity zones.

Moreover, although it is not described in detail in the above description, regarding the integrating time period, a correction of the integrating time period may be achieved by changing the setting of one or both of a coherent integrating period of time and a non-coherent integrating period of time.

Moreover, in the above description, the example of sorting the searching target frequency $F_{sig}$ into the plurality of frequency zones and setting the integrating time period for every frequency zone is given; however, the integrating time period can be set for every searching target frequency $F_{sig}$ according to the frequency differential value between the searching target frequency $F_{sig}$ and the search reference frequency $F_{SB}$. In this case, for example, the integrating time period may be set to be shorter as the frequency differential value between the searching target frequency $F_{sig}$ and the search reference frequency $F_{SB}$ becomes higher.

Figure 17:
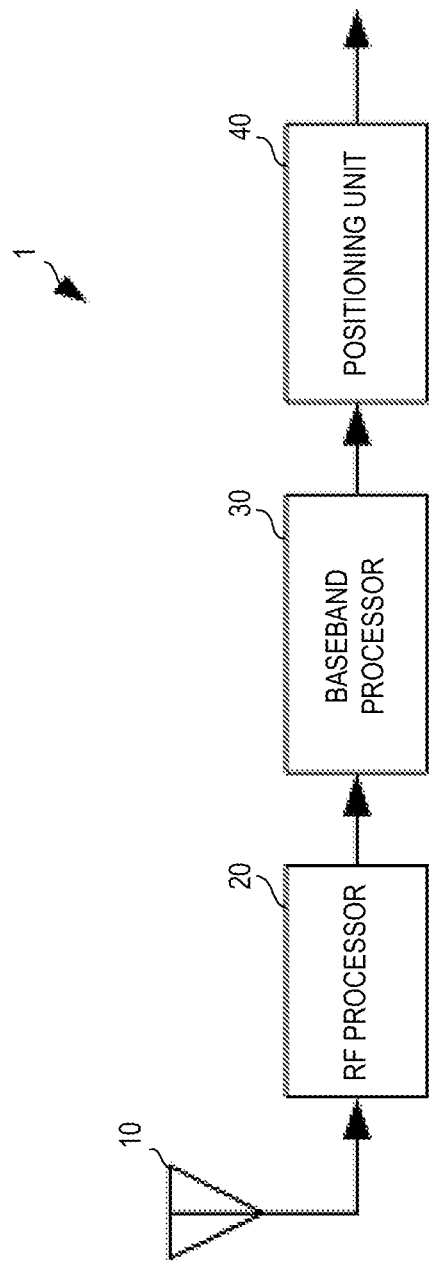
FIG. 17 is a block diagram illustrating a configuration of a GPS signal reception apparatus 1 according to the embodiment of this disclosure.

The processing described above can be achieved by a GPS signal reception apparatus having the configuration described as follows. FIG. 17 is a block diagram illustrating a configuration of a GPS signal reception apparatus 1 according to the embodiment of this disclosure.

The GPS signal reception apparatus 1 includes a GPS reception antenna 10, an RF processor 20, a baseband processor 30, and a positioning unit 40.

The GPS reception antenna 10 receives a GPS signal broadcasted (transmitted) from each GPS satellite, and outputs it to the RF processor 20. The RF processor 20 down-converts the received GPS signal, generates a medium frequency signal (IF signal), and outputs it to the baseband processor 30.

The baseband processor 30 corresponds to "the signal searching device" including "the correlation value acquiring module" and "the determining module" of this disclosure. Moreover, the baseband processor 30 also corresponds to the "capturing and tracking module." Note that, the baseband processor 30 may be achieved by hardware corresponding to "the determining module" and hardware corresponding to "the correlation value acquiring module" and "the capturing and tracking module" individually, or integral hardware. The baseband processor 30 generates a baseband signal by multiplying an IF signal by a carrier frequency signal, and performs capturing and tracking of the GPS signal based on the baseband signal. Here, the signal searching method described above is used in capturing. Thus, the false capturing of cross-correlation can be suppressed and the target GPS signal can surely be captured.

The processing of such captured GPS signal shifts from the capturing to the tracking. A code correlation result and a carrier correlation result obtained during this tracking, and further a pseudorange obtained based on the code correlation result are outputted to the positioning unit 40.

The positioning unit 40 modulates a navigation message based on the code correlation result, and performs positioning of the GPS signal reception apparatus 1 based on the code correlation result, the carrier correlation result, and the pseudorange.

By using such a configuration and the signal searching method described above, the false capturing is prevented and speedy capturing can be performed. Therefore, the tracking accuracy of the GPS signal improves and, as a result, the accuracy of the positioning result can also be improved.

Note that, the baseband processor 30 configured to perform the signal searching method described above may also be achieved by a hardware set configured to perform each processing, or may also be achieved by a mode in which it is stored in a memory medium in advance in a state where each processing of the signal searching method described above is programmed, and the program is read and executed by a computer.

Figure 18:
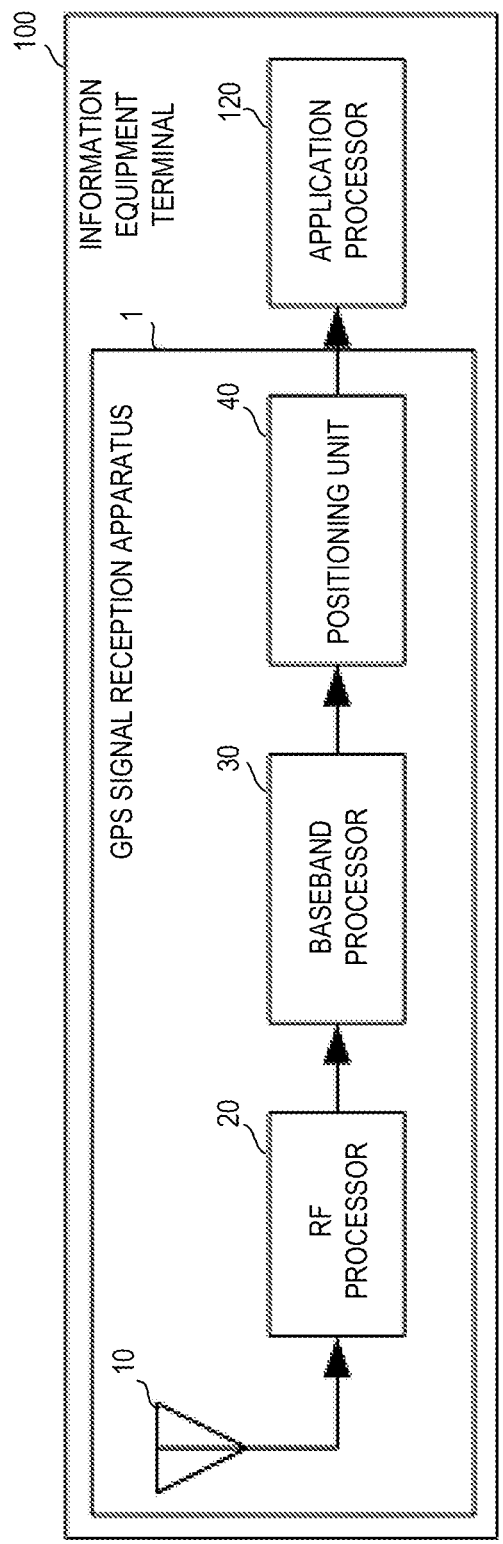
FIG. 18 is a block diagram illustrating a configuration of an information equipment terminal 100 provided with the GPS signal reception apparatus 1.

Moreover, such GPS signal reception apparatus 1 and the GPS signal receiving function are utilized for an information equipment terminal 100 illustrated in FIG. 18. FIG. 18 is a block diagram illustrating a main configuration of the information equipment terminal 100 including the GPS signal reception apparatus 1 of this embodiment.

The information equipment terminal 100 illustrated in FIG. 18 is, for example, a mobile phone, a car navigation device, a PND, a camera, and a watch. The information equipment terminal 100 includes the antenna 10, the RF processor 20, the baseband processor 30, the positioning unit 40, and an application processor 130. The position unit 40 has the above configuration, and the GPS signal reception apparatus 1 is configured by these components as described above.

The application processor 130 displays a position or a speed of the GPS signal reception apparatus 1 and performs processing to be utilized in, for example, a navigation, based on the positioning result outputted from the GPS signal reception apparatus 1.

With such a configuration, highly accurate positioning result can be obtained as described above; thus, highly accurate position display, navigation and the like can be achieved.

DESCRIPTION OF REFERENCE NUMERAL(S)

1: GPS Signal Reception Apparatus; 10: GPS Reception Antenna; 20: RF Processor; 30: Baseband Processor; 40: Positioning Unit; 100: Information Equipment Terminal; and 130: Application Processor.

The invention claimed is:

1. A method of searching a signal to capture a target signal, comprising:
    acquiring a plurality of correlation values by correlating a reception signal with a plurality of replica signals of the target signal, the replica signals generated at a plurality of frequencies, respectively, that are set at frequency intervals as one group determined based on a cycle of a diffusion code used to modulate the target signal; and
    determining whether the target signal is successfully captured, based on the plurality of correlation values in the group;
    wherein when it is determined that the target signal is not successfully captured by the determining of whether the target signal is successfully captured, the plurality of frequencies are shifted by a fixed frequency width shorter than the frequency interval, the fixed frequency width being determined according to a resource amount for performing a calculation.

2. The method of searching the signal of claim 1, wherein the target signal is an L1 wave of a GPS signal, and
    wherein each frequency interval is an interval of 1,000 Hz.

3. The method of searching the signal of claim 1, wherein the determining whether the target signal is successfully captured includes:
    detecting a highest correlation value for every frequency in the group;
    setting the highest correlation values to be peak correlation values of the frequencies, respectively; and
    determining whether the target signal is successfully captured, based on a high/low relationship of the peak correlation values of the respective frequencies.

4. The method of searching the signal of claim 3, wherein the determining whether the target signal is successfully captured includes:
    detecting a highest peak value that is a highest value among the peak correlation values of the respective frequencies;
    determining a highest noise value among the peak correlation values of the respective frequencies other than the highest peak value; and
    calculating a ratio between the highest peak value and the highest noise value,
    wherein whether the target signal is successfully captured is determined based on the ratio.

5. The method of searching the signal of claim 1, wherein the acquiring, by setting the plurality of frequencies into one group, the plurality of correlation values includes:
    setting a search reference frequency based on a frequency of a signal currently tracked and the frequency interval;
    setting, according to a difference between the search reference frequency and a search target frequency, an integrating period of time with the search target frequency; and
    calculating an integrated correlation value by integrating the correlation values for the set integrating time period.

6. The method of searching the signal of claim 5, wherein the setting, according to the difference between the search reference frequency and the search target frequency, the integrating period of time includes:
    determining a plurality of frequency zones that the search target frequency is able to selectively correspond to, according to the difference between the search reference frequency and the search target frequency;
    determining which one of the plurality of frequency zones the search target frequency belongs to; and
    setting the integrating time period for every frequency zone.

7. A signal searching device for capturing a target signal, comprising:
    a correlation value acquiring module configured to acquire a plurality of correlation values by correlating replica signals of the target signal with a reception signal, with a plurality of frequencies that are set at frequency intervals as one group determined based on a cycle of a diffusion code used to modulate the target signal; and
    a determining module configured to determine whether the target signal is successfully captured, based on the plurality of correlation values in the group;
    wherein when it is determined that the target signal is not successfully captured by the determining whether the target signal is successfully captured, the plurality of frequencies are shifted by a fixed frequency width shorter than the frequency interval, the fixed frequency width being determined according to a resource amount for performing a calculation.

8. The signal searching device of claim 7, wherein the target signal is an L1 wave of a GPS signal, and
    wherein the frequency interval is an interval of 1,000 Hz.

9. The signal searching device of claim 7, wherein the determining module detects a highest correlation value for every frequency in the group, sets the highest correlation values to be peak correlation value of the respective frequencies, and determines whether the target signal is successfully captured, based on a high/low relationship of the peak correlation values of the respective frequencies.

10. The signal searching device of claim 7, wherein the correlation value acquiring module includes:
    a search reference frequency setting module configured to set a search reference frequency based on a frequency of a signal currently tracked and the frequency interval;
    an integrating time period determining module configured to set, according to a difference between the search reference frequency and a search target frequency, an integrating period of time with the search target frequency; and
    a correlation value calculating module configured to calculate an integrated correlation value by integrating the correlation values for the set integrating time period,
    wherein the determining module uses the integrated correlation value as the correlation values for determining whether the target signal is successfully captured.

11. A Global Navigation Satellite System (GNSS) signal reception apparatus, comprising:
    the searching device described in claim 7;
    a capturing and tracking module configured to capture and track the target signal based on the correlation values; and
    a positioning unit configured to perform positioning based on the tracking result.

12. An information equipment terminal, comprising:
    the GNSS signal reception apparatus described in claim 11; and
    an application processor configured to execute a predetermined application by using a positioning result of the positioning unit.

* * * * *